(12) United States Patent
Blackburn et al.

(10) Patent No.: US 11,610,202 B2
(45) Date of Patent: *Mar. 21, 2023

(54) IMMUTABLE LEDGER DIGITAL PHYSICAL ASSET AUDIT PLATFORM

(71) Applicant: Scientia Potentia Est., LLC, Charleston, SC (US)

(72) Inventors: Jeremy Blackburn, Charleston, SC (US); Justin Southward, Fort Meyers, FL (US); W. Kurt Taylor, N. Charleston, SC (US); Karl David, Charleston, SC (US); Austi Critchfield, Clearwater, FL (US); Michael Lu, N. Charleston, SC (US); Tim McVicker, Charleston, SC (US); Kevin Donaghy, Belfast (IE)

(73) Assignee: Scientia Potentia Est II, LLC, Charleston, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/686,502

(22) Filed: Mar. 4, 2022

(65) Prior Publication Data

US 2022/0188821 A1 Jun. 16, 2022

Related U.S. Application Data

(63) Continuation-in-part of application No. 17/566,957, filed on Dec. 31, 2021, which is a continuation-in-part of application No. 17/531,746, filed on Nov. 20, 2021, which is a continuation-in-part of application No. 17/531,598, filed on Nov. 19, 2021, which is a continuation-in-part of application No. 17/344,043, filed on Jun. 10, 2021, which is a continuation-in-part (Continued)

(51) Int. Cl.
*G06Q 20/40* (2012.01)
*G06F 21/64* (2013.01)

(52) U.S. Cl.
CPC .................... *G06Q 20/401* (2013.01)

(58) Field of Classification Search
CPC .. G06Q 20/401; G06Q 10/20; G06Q 2220/00; G06Q 20/065; G06Q 20/14; G06Q 20/4014; G06Q 20/4015; G06Q 30/018
USPC ......................................... 705/44
See application file for complete search history.

(56) References Cited

U.S. PATENT DOCUMENTS

| | | | |
|---|---|---|---|
| 10,338,913 B2 * | 7/2019 | Franchitti | G06F 16/9538 |
| 2017/0031676 A1 * | 2/2017 | Cecchetti | G06F 21/64 |

* cited by examiner

*Primary Examiner* — Garcia Ade
(74) *Attorney, Agent, or Firm* — Kim and Lahey Law Firm, LLC; Douglas W. Kim

(57) ABSTRACT

This computerized system can include a computer system in communication with an immutable storage; a first data capture device and a second data capture device can be in communications with the computer system; a set of computer readable instructions can be included in the computer system configured for receiving a first event record including a first location, a first time and a first set of metadata wherein the first set of metadata includes an original digital representation captured by the first data capture device of the physical object, receiving a subsequent event record from the second data capture device and, determining if the original digital representation is equivalent to the subsequent digital representation thereby providing for verification that the same physical object transitioned from an originating event to a subsequent event.

21 Claims, 17 Drawing Sheets

Related U.S. Application Data of application No. 17/230,911, filed on Apr. 14, 2021, now Pat. No. 11,288,761, which is a continuation-in-part of application No. 17/176,056, filed on Feb. 15, 2021, now Pat. No. 11,288,308, which is a continuation-in-part of application No. 17/128,084, filed on Dec. 19, 2020, which is a continuation-in-part of application No. 16/997,840, filed on Aug. 19, 2020, which is a continuation-in-part of application No. 16/994,585, filed on Aug. 15, 2020, now Pat. No. 11,232,652, which is a continuation-in-part of application No. 16/991,916, filed on Aug. 12, 2020, now Pat. No. 11,216,823, which is a continuation-in-part of application No. 16/876,080, filed on May 17, 2020, now Pat. No. 11,423,360, which is a continuation-in-part of application No. 16/810,782, filed on Mar. 5, 2020, now Pat. No. 11,216,781, which is a continuation-in-part of application No. 16/510,642, filed on Jul. 12, 2019, now Pat. No. 11,216,772, which is a continuation-in-part of application No. 16/452,076, filed on Jun. 25, 2019, now abandoned, said application No. 16/810,782 is a continuation-in-part of application No. 16/510,634, filed on Jul. 12, 2019, now Pat. No. 10,713,737, which is a continuation-in-part of application No. 16/452,076, filed on Jun. 25, 2019, now abandoned.

IMMUTABLE LEDGER DIGITAL PHYSICAL ASSET AUDIT PLATFORM

RELATED APPLICATIONS

This application is a continuation in part of U.S. patent application Ser. No. 17/566,957 filed Dec. 31, 2021 which is in turn a continuation in part of U.S. patent application Ser. No. 17/561,827 filed Dec. 24, 2021 which is in turn a continuation in part of U.S. application Ser. No. 17/531,746 filed Nov. 20, 2021 which is in turn a continuation in part of U.S. application Ser. No. 17/531,598 filed Nov. 19, 2021 which in turn is a continuation in part of U.S. application Ser. No. 17/344,043 filed Jun. 10, 2021 which in turn is a continuation in part of U.S. application Ser. No. 17/230,911 filed Apr. 14, 2021 which in turn is a continuation in part of U.S. application Ser. No. 17/176,056 filed Feb. 15, 2021 which in turn is a continuation in part of U.S. application Ser. No. 17/128,084 filed Dec. 19, 2020 which in turn is a continuation in part of U.S. application Ser. No. 16/997,840 filed Aug. 19, 2020, which is a continuation in part of U.S. application Ser. No. 16/994,585 filed Aug. 15, 2020 (now U.S. Pat. No. 11,232,652 issued Jan. 25, 2022) which in turn is a continuation in part of U.S. patent application Ser. No. 16/991,916 filed on Aug. 12, 2020 (now U.S. Pat. No. 11,216,823 issued Jan. 4, 2022) which in turn is a continuation in part of U.S. patent application Ser. No. 16/876,080 filed May 17, 2020 which in turn is a continuation in part of U.S. patent application Ser. No. 16/810,782 filed on Mar. 5, 2020 (now U.S. Pat. No. 11,216,781 issued Jan. 4, 2022) which in turn is a continuation in part of U.S. patent application Ser. No. 16/510,634 filed on Jul. 12, 2019 (now U.S. Pat. No. 10,713,737 issued Jul. 14, 2020) and U.S. patent application Ser. No. 16/510,642 filed on Jul. 12, 2019 (now U.S. Pat. No. 11,216,772 issued Jan. 4, 2022), which are all incorporated by reference. Patent application Ser. Nos. 16/510,542 and 16/510,634 are both continuations of U.S. patent application Ser. No. 16/452,076 filed Jun. 25, 2019, which all are incorporated by reference.

BACKGROUND

1) Field of the System

A system for auditing the capturing and storage of digital information including immutably stored digital information, paired digital representations with physical object, verifiable link between a physical object and a virtual representation and digital representations of event and individual associated with the digital and physical object, transaction and events.

2) Background

With the increasing use of technology, all industries face risk and compliance challenges. This is especially true with the increased use of digital technologies such as paperless transactions, financial institution systems, property ownership records, crypto-currencies and the like. This has led to an increased focus on system that are designed to manage governmental, risk, audit, and compliance (GRC). For example, digitizing governance materials allows access in real-time to industry and competitor data and can assist an organization to act timely on opportunities. Due to the important of GRC data, secure storage and communications is needed while also allowing the sharing of specific information, both confidentially and publicly, with third parties. GRC systems are designed to provide for entities to reach key objectives, analyze and evaluate data, proactively spot risks, and take advantage of opportunities in a more timely fashion.

This continuing trend for digitization includes attempts to create digital representations of physical objects so that the physical objects can be properly and accurately represented. Historical, digitization focused on creating a digital representation of a physical object so that the digital information can be manipulated by information systems and stored on a database. For example, a bank balance can be the digital representation of the fiat currency that is in the possession of the bank account holder. While these systems are sufficient for fungible objects such as currency, there is a challenge when the object is not fungible and needs to be tracked. For example, during the manufacturing of a good, components for that good can be specific to that good and are not readily substituted between different goods. Therefore, traditional methods of tracking parts such as UPC and other barcodes are not sufficient. The UPC, for example, does not necessarily capture the changes to the part from year to year nor events that are associated with the part such as repairs or associations with events. This disadvantage is evidence when a replacement part is used that, while using the same UPC, the replacement part is the original part.

Using existing technology taken from industries such as the financial industry does not solve the problem as they cannot verifiably pair a digital representation with a physical object. In the financial industry, digitization begins with electronic information representing the dollar value of an account and not a specific physical dollar itself. As the financial industry progressed, the electronic currency itself became the asset as discussed in U.S. Pat. No. 9,135,787, this patent discloses a Bitcoin kiosk/ATM that facilitates the buying or selling of Bitcoin. The underlying technology for Bitcoin is a blockchain. Blockchain alone cannot verifiably pair a digital representation with a physical object because there is no linkage between the physical object and the digital asset under the Bitcoin scheme alone. Blockchain provides an immutable data stream, or temporarily linear sequence of confirmed and verified data, rather than the ability to pair physical objects with digital representation.

Another disadvantage of blockchain is that the inability to verify transactions is generally limited to miners wherein the mining process is essentially the verification of a transaction. A transaction is the verification of preceding data blocks as well as confirmation of the current block. There have been some attempts to create verification systems, but none has proven to have sufficient accuracy needed for commercialization of these systems. For example, U.S. Pat. No. 10,790,963 uses a pattern count calculator that calculates the number of transaction patterns for a generating party using the blockchain generation apparatus. This requires that an identifier of the generating party is used with a block generation condition checker to determine whether the generating party is qualified to generate the new blockchain data.

This type of digitization where the digital information represents the asset that is to be distinguished with electronic scanning of a physical assets. Electronic scanning simply creates a digital copy that is separate from the physical object and becomes an independent object itself. Despite the illegality of this example, the digital scan of US currency and the US currency itself are not equivalent. The US currency can be spent without reference or modification of the digital scan and the digital scan can be manipulated without reference or modifications to the US currency. The physical and the digital are not verifiably paired. The inability to pair the digital representation with physical object makes traditional digitization of physical objects challenging as the digital object and the virtual representation are not functional equivalents and therefore are not verifiably paired.

The ability to track object during a process can be improved when the object is properly and verifiable paired with a digital representation. In many industries, the systematic and logical workflow of physical objects increases the success of any project, process, activity, or providing a service. There is also a need to verify existing transactions that are stored on a blockchain or another immutable ledger. Currently, there is a lack of accountability, verification and reliability between physical objects and digital representations. The inability to verify the pairing of physical objects with digital representations negatively impacts current processes, increases risks, and increases costs in general. While there have been some attempts to add item information to a physical material, such as U.S. Pat. No. 8,321,302, these attempts have focused on tracking inventory levels and do not include verifiably pairing a physical object with a virtual representation. Further, these prior attempts focus on the identifier and not the physical object itself. Therefore, there is no assurance that the identifier remains associated with the physical object nor the ability to verify that it remains associated after the initial storage. This disadvantage can be seen in U.S. Pat. No. 8,521,620 which specifically states that if a RFID tag is lost or damaged, the system allows a user to enter an item number or style and tags of similar items are displayed, a new tag is generated and associated with the item having the lost or damaged tag. The ability to change RFID tags expressly shows that the physical object is not paired with the digital representation.

There have also been attempts to use inspections to assist with monitoring physical objects during a process. There have been attempts to provide for automated inspection such as U.S. Pat. No. 7,508,973 which discloses method of inspecting detects includes assigning a plurality of sets of image acquisition conditions, executing inspection using each of the sets of conditions, classifying all detected defects into real defects and false defects by use of an automatic defect classification function, and selecting, from the plurality of sets of conditions, a set of conditions ideal for detection. However, this attempt is reduced to a snapshot in time in the products lifecycle. This attempt does not pair the physical object to a digital representation, nor does it provide for an audit trail throughout the process.

There have been some attempts to improve tracking of articles such as shown in U.S. Pat. No. 7,898,403 that are directed to a method and system for detecting construction equipment process failures. A database is populated from information from a third-party source and a process failure report is provided for processes that are outside a norm assigned to the construction equipment asset. U.S. Pat. No. 7,031,930 is directed to a method and system for managing complex projects or processes by monitoring subcontractors in real time, against a system after commencement of the project. U.S. Pat. No. 8,004,397 is directed to a mountable reporting source comprising a controller coupled with an interrogating component configured for automatically receiving an identifier which is unique to an asset having a position determining component. U.S. Pat. No. 8,428,904 discloses product integrity tracking system, shipping label and associated method. This patent is directed to label body for attaching to a product to be shipped or to packaging containing the product.

These systems do not verify the data stored and associated with the life of a project or process and do not account for the physical goods being detached from the "tag". The inability to verify data and that a digital representation is paired with the physical object prevents the use of digital wallets for this purpose since a digital wallet does not include such as pairing. Previous attempts to verify such transactions fail to pair a physical object with a digital representation, disadvantages that can be seen in United States Patent Application Publication 20190303919.

It would be an advantage to have a system that can verify the paring of physical objects with virtual representations so that information systems can be used to track physical objects with reduced or eliminated risks that the digital representation no longer represents the original physical object.

It would be advantageous to have a system that can provide for multi-party verification of the pairing of a physical asset with a virtual representation for tracking of the physical asset and the associated project.

SUMMARY OF THE SYSTEM

The computerized system can include a computer system in communication with an immutable storage; a first data capture device in communications with the computer system; a second data capture device in communications with the computer system; a set of computer readable instructions included in the computer system configured for: receiving an event record ($E_1$) from the first data capture device including a first location ($L_1$), a first time ($T_1$) and a first set of metadata ($M_1$) wherein the first set of metadata includes an original digital representation captured by the first data capture device of the physical object, receiving a subsequent event record ($E_2$) from the second data capture device including a second location ($L_2$), a second time ($T_2$) temporally subsequent to the first time and a second set of metadata ($M_2$) wherein the second set of metadata includes a subsequent digital representation captured by the second data capture device of the physical object, and, determining if the original digital representation is equivalent to the subsequent digital representation thereby providing for verification that the same physical object transitioned from an originating event to a subsequent event.

The event record can include a verification code that can be used to verify that the data in the event record remains accurate from its creation of from another time. The verification can have several constructions including checksum. A checksum can be small block of data, usually digital, derived from another block of digital data configured for use for detecting errors that can occur transmission, storage or unintentional or intentional tampering with the data. A first record can have a first checksum. A second record can have a second checksum. The second checksum can be derived from the first and the second record so that alteration of the first or second record can be detected with the second checksum.

The verification can be a hash. A hash can be a mathematical function that is configured to converts an input, such as a data record, into an encrypted output, typically having a fixed length. Therefore, a unique hash can be the same size regardless of the size of amount of the input (e.g., data). Further, the hash can be configured to prevent reverse-engineering of the input because the hash functions is a one-way function. When analyzing a record, such as an event record, comparing a first hash that can be created and stored with the event record and a second hash calculated when the event record is retrieved can provide validation that the data is unaltered from storage to retrieval. The verification code can be the hash.

The event record can also include the validation code that is created according to a set of validation rules. These rules can control what information can be included in a record and verification that the record includes data or at least the type of data that is contained in the record. Validation rules can include data type, code type, range check, format check, consistency check and uniqueness check. These rules can be used to both assist with the type of data inputted and whether the data has been altered from storage to retrieval. Validation can also be performed with sampling a subset of data or records from a database and extrapolating accuracy of the data from origin creation to storage through retrieval.

In one example, a data record is an input that is processed with computer readable instructions configured with a hashing algorithm that can include a secure hashing algorithm, message digest algorithm, Keccak, RACE integrity primitives evaluation message digest, Whirlpool, BLAKE, and the like and any combination. The output can be a first verification code and that first verification code is stored on an immutable ledger or other secure location. The hashing algorithm can be deterministic so that the input will results in the same output. The hashing algorithm can be configured to prevent the ability to see or read the data that is the original input. The hashing algorithm can be configured so that a small change, even one byte, will change the output. Therefore, the first output of the data will not match the second output if the data is changed between when the first data and the second data is determined.

The set of computer readable instructions can include instructions for determining if a similarity between the original digital representation and the subsequent digital representation is within a predetermine range. The first data capture device can be remote from the computer system. The subsequent event record can include a verification data representing that verification of the physical object subject to the subsequent event is the same physical object associated with the originating event according to the first event record. The set of computer readable instructions can include storing the first event record on the immutable storage and the set of computer readable instructions for determining if the first digital representation is equivalent to the subsequent digital representation includes retrieving the first event record from the immutable storage. The subsequent event record can include a verification data representing that an individual viewed the metadata of the first event record and compared it with the physical object. The second set of metadata is taken from sources from the group consisting of public records, enterprise software, computer device or any combination thereof.

The computerized system can include a computer system in communication with an immutable storage; a set of computer readable instructions included in the computer system configured for: retrieving a first event record ($E_1$) from the immutable storage wherein the first event record includes first location ($L_1$), a first time ($T_1$) and a first set of metadata ($M_1$) wherein the first set of metadata includes a first digital representation captured by a first data capture device of the physical object, retrieving a subsequent event record ($E_2$) from the immutable storage including a second location ($L_2$), a second time ($T_2$) temporally subsequent to the first time and a second set of metadata ($M_2$) wherein the second set of metadata includes a subsequent digital representation captured by a second data capture device of the physical object, and, determining if a similarity exists between the original digital representation and the subsequent digital representation is within a predetermine range.

The set of computer readable instructions can include instructions for determining if the physical object is the same physical object represented by the first digital representation during an occurrence of a second event. The subsequent event record can include a verification data representing that verification of the physical object subject to the subsequent event is the same physical object associated with the first event. The subsequent event record can include a verification data representing that an individual viewed the metadata of the first event record and compared it with the physical object. The first data capture device can be a remote from the computer system and the second data capture device.

The system can include for verifiably pairing a physical object with a digital representation comprising: a computer system in communication with an immutable storage; a data capture device in communications with the computer system; a set of computer readable instructions included in the computer system configured for: retrieving a first event record ($E_1$) from the immutable storage wherein the first event record includes a first location ($L_1$), a first time ($T_1$) and a first set of metadata ($M_1$) wherein the first set of metadata includes a first digital representation captured by a first data capture device of the physical object, creating a subsequent event record ($E_2$) from the data capture device including a second location ($L_2$), a second time ($T_2$) temporally subsequent to the first time and a second set of metadata ($M_2$) wherein the second set of metadata includes a second digital representation captured by the data capture device of the physical object, and, determining if a similarity between the first digital representation and the second digital representation exists.

The computer readable instructions can include instruction for determining if the similarity is within a predetermine range. The computer readable instruction can include instructions for determining if a similarity between the first digital representation and the second digital representation exists includes retrieving the first event record from the immutable storage. The subsequent event record includes a verification data representing that verification of the physical object subject to the subsequent event is the same physical object associated with the first event according to the first event record. The data capture device can be a first data capture device; and, the computer readable instruction can include instructions for determining if a similarity between the first digital representation and the second digital representation exists includes retrieving a first image of the physical object, comparing the image to a second image captured by a second data capture device and determining if the images represent the same physical object. The instructions can determine if a similarity between the first digital representation and the second digital representation exists includes capturing an object indicium affixed to the physical object, comparing the indicium on the object at the subsequent event to a digital indicium included in the first event record. The subsequent event record can include a verification data representing that an individual viewed the object indicium and compared it with the digital indicium retrieved from the immutable storage and included in the first event record.

In one embodiment, the system can provide a hashed event record where the event record can include metadata associated with a capture device as well as indicium associated with the physical object and store the record on a blockchain platform including the platforms associated with Bitcoin, Ethereum and the like.

DETAILED DESCRIPTION

Figure 1A:
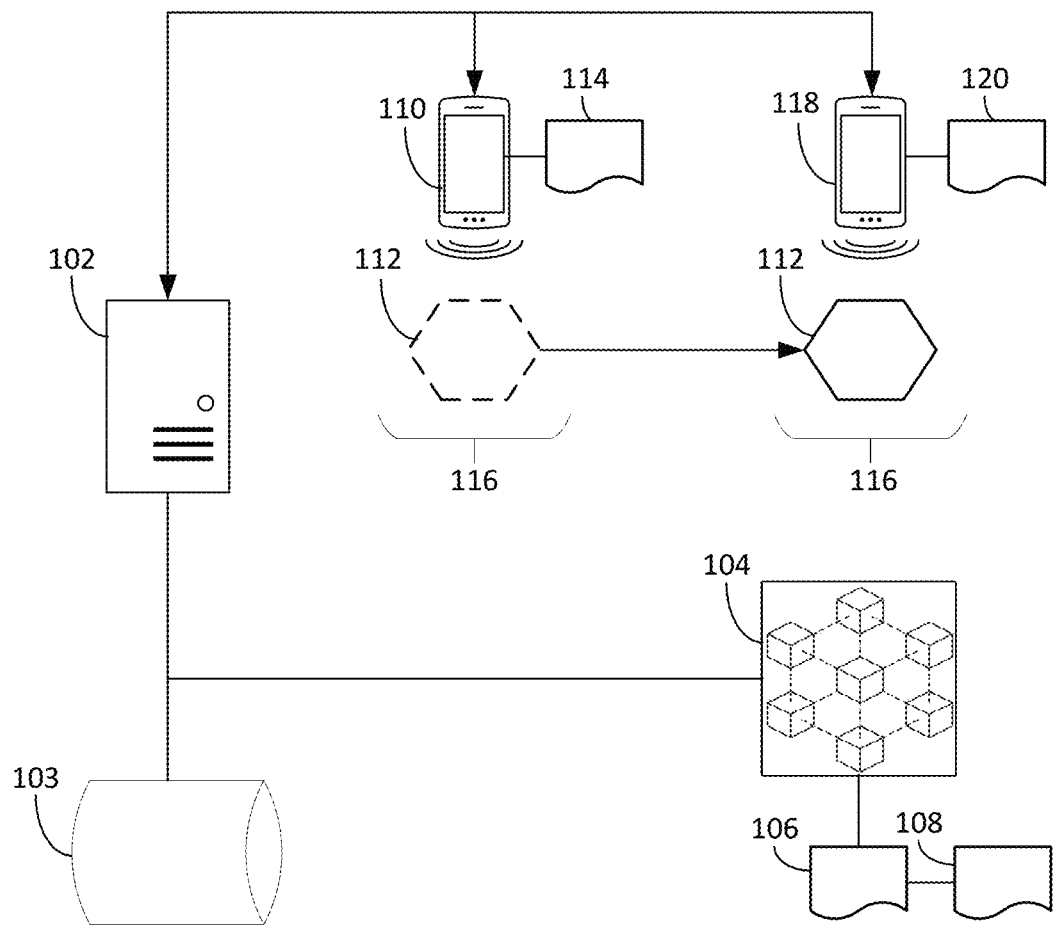
FIG. 1A is a diagram of aspects of the invention.

The present system provides for verified pairing of a physical object with a virtual representation. Referring to FIG. 1A illustrates a computer system 102 can be in communications with a database 103 and a second data storage system 104. Each of the data storage systems can be centralized, decentralized, immutable, distributed, local, remote, shared, private, virtual and any combination. The first data system can differ from the second data system. The first and second data storage systems can be immutable and persistent so that the information stored on the data system, once storage, cannot be changed. The data systems can include a plurality of computer systems where data can be copies onto each computer system. Examples of data storage platforms include hard drives, solid state drives, tapes, and cloud storage systems. The immutable data storage system can use blockchain, crypto-shredding, WORM, append only, distributed ledger technology, immutable cloud storage, immutable record retention (e.g., Oracle Cloud Infrastructure Object Storage, Quantum Ledger Database, and any combination thereof). In one embodiment the immutability is accomplished by the data storage system only allowing records to be appended to the storage media without the ability to modify the record once written. One such system includes blockchain. When a first record 106 is written to the data storage system, the record cannot be changed. When a second record 108 is written to the data storage system, it is stored later in time to the first record thereby effectively providing a chronologically trail of events associated with the physical object and digital representation.

In one embodiment, the first record can be associated with a first event and a second record can be associated with a second event. The order the first record and the second record are written on the immutable storage can be used to show that some period of time elapsed between the first record and the second record. This functionality can add to the verification process as attempts to improperly tamper with the immutable storage may be discovered when the first record and the second record are not in chronological order. This functionality can also apply to, include and verify items, people, places, association, activities, events as well as confirm previous recording and storage of such information.

Further attempts to improperly tamper with the immutable storage can be discovered when the metadata of the first record and the second record are inconsistent with the first record and the second record being stored chronologically.

The first event record can be associated with a first event and the second event record can be associated with a second event. The data associated with these events can be retrieved from the capture device and used in creating and writing the associated event record. If the date and time setting of the data capture device are incorrect, this discrepancy can be identified by comparison with the event record created and compared to related records in the immutable storage. In one embodiment, metadata integrity used by the system can be designed to identify inconsistencies with date and time. For example, a drone can be used to capture one or more images from a project, such as construction roof project, and the drone may experience date and time inaccuracies so that the date and time in its metadata is in error. The data can include the recorded data and the metadata. The error or inconsistency can be identified by comparing the irregular time of the drone and the hash/block time of the metadata that was committed to the persistent storage layer. The difference can be with a range that results in an alert being sent to a user. This alert allows the users to remedy the error, repair the device (e.g., drone) and mitigate risk of date and time, and other inconsistencies, in the future.

The first event can differ from the second event by time, activity, process, location, or any combination. In one embodiment, metadata associated with the event and event record and a ledger hash time, representing when the event record is stored (e.g., committed) to the immutable storage can be used to validate the metadata provided from the data capture device. If the data capture device has an incorrect time, a comparison of the ledger hash time with the metadata from the data capture device can identify an error. Identifying an error can be used to alert users to data capture device issues and can indicate that the data capture device needs to be serviced or replaced prior to its next use.

The metadata that can be associated with the capture device can include weather conditions, which can include a sun angle, which can be compared with environmental weather conditions to approximate the data capture time. Metadata associated with an image of video can be used to verify weather conditions in the image or video. Time and location metadata can be retrieved from publicly sources or remote sources and captured with the device metadata to determine of the captured weather in the image or video is the same as being reported locally on that day and at that time.

In one example, a drone can be the capture device and images, or video captured from the drone of a physical object such as a roof can show repairs that occur over time. In the event that the drone footage was disputed, metadata that can include location, date and time and comparing weather visible in drone footage to reported weather conditions to add verification to the drone metadata. In one example, data associated with a worker, such as a vehicle, license plate, of other indicia can be captured by the drone. For example, if a license plate can be captured, the license plate information can be compared with public data and the attendance of the worker at a location or physical object can be verified.

The metadata that is captured can be dependent upon the device and can include metadata associated with a worker, equipment, weather, enterprise software, security hardware and software, material, indicia, smart contracts, public records, authentication information, date, time, location, entity and any combination of these examples. The biometric data may include facial recognition, an iris/retinal scan, a fingerprint scan, a hand scan, a voice print, or heart rate signature and any combination.

In one embodiment, an image or video captured can be used to identify an approximate time where data was captured by the data capture device. The metadata associated with the data capture can include weather conditions, sun angle, which can be compared with environmental weather conditions to approximate the data capture time. In one embodiment, the data capture can include the location so that the location of the data capture device can be used to retrieve environmental weather conditions when the data capture occurs.

The data capture device can capture data in response to an event associated with the physical object. For example, if the physical object changes location, is modified, transferred, integrated, or other action, process or procedure associated with the physical object can signify an event.

A location can include a manufacturing place, construction site, business providing services, origination site, delivery site, event site, or other location where an object or materials will be used including the creation, collection, maintenance, repair, use, or integration of the object or material.

Verification, including verification of an event, can include verifying that the physical object and the virtual representation match and can be accomplished in a variation of methods including interaction with identification elements such as a tag, label, and the like, capturing an image of the material, capturing a video of the material, capturing indicia such as a tag physically affixed or otherwise associated with the material, human visual inspection, and any combination. Identification of an individual performing or otherwise associated with an event can be captured by identification devices (e.g., cards, tags, RF ID) and biometrics including visual capture (e.g., facial recognition), voice recognition, iris scan, fingerprint, palm print, weight, dimensions, change in weight, dimensions or other attributes, and any combination. Examples of verification processes can include having stored data about the physical object and comparing the physical object with the date, using machine learning process video, using imagery, audio clips and other media to and any combination. Individual human inspectors can be used to verify physical objects and events onsite and offsite. Individuals can process video, imagery, audio clips and other media to verify assets and events and provide the verification to the system at one or more events. Upon verification of an event, smart contracts can be executed according to verification of the physical object and event.

In operation, a first data capture device 110 can be in communications with the computer system 102 so that data captured by the first data capture device can be transmitted to the computer system. The first data capture device can have a first capture device metadata 114 originating from the data device that can be included in the first record 106. The first data capture device can also capture object data associated with the physical object. Object data can include an image of the physical object, tag, label, RFID, weight, dimensions, and other indicia and any combination thereof. The object data can be captured at a first event 116 that can include a change in state of the physical object, change in location change in time or any combination thereof. When an event occurs, which can be a second event, a second data capture device 118 can have a second capture device metadata 120 originating from the data device that can be included in the second record 108. The second data capture device can also capture object data associated with the physical object 112 at the second event.

The first capture device metadata and object data can be used to create the first record which can be a first event record. The first event record can be stored on the immutable storage. The second capture device metadata and object data captured by the second data capture device can be used to create the second record which can be a second event record. The second event record can be stored on the immutable storage. Immutable storage can be a storage medium or system where the data or object being stored cannot be changed or modified after its storage.

During data capture by the first data capture device, object indicia can be capture where the object indicia is associated with the object. The object indicia can include a still image of the object, a label affixed to the object, a radio frequency identification (RFID) tag, an ultra-high frequency (UHF) tag, a bar code, a QR code, a Bluetooth beacons, alphanumeric characters, and any combination thereof. The object indicia can be included in the first event record and stored on the immutable storage. When a change in time, location or other event occurs the second data capture device can capture the object indicia. Once captured, the object indicia can be compared to the object indicia in the first event record and if the two matches, then verification exists that the physical object associated with the second event is the same physical object that was present at the first event. In one embodiment, the second capture device can capture data, transmit the data to the computer system 102 and computer readable instructions on the computer system can perform the comparison of the object indicia capture as the second event with the object indicia included in the first event record.

Figure 1B:
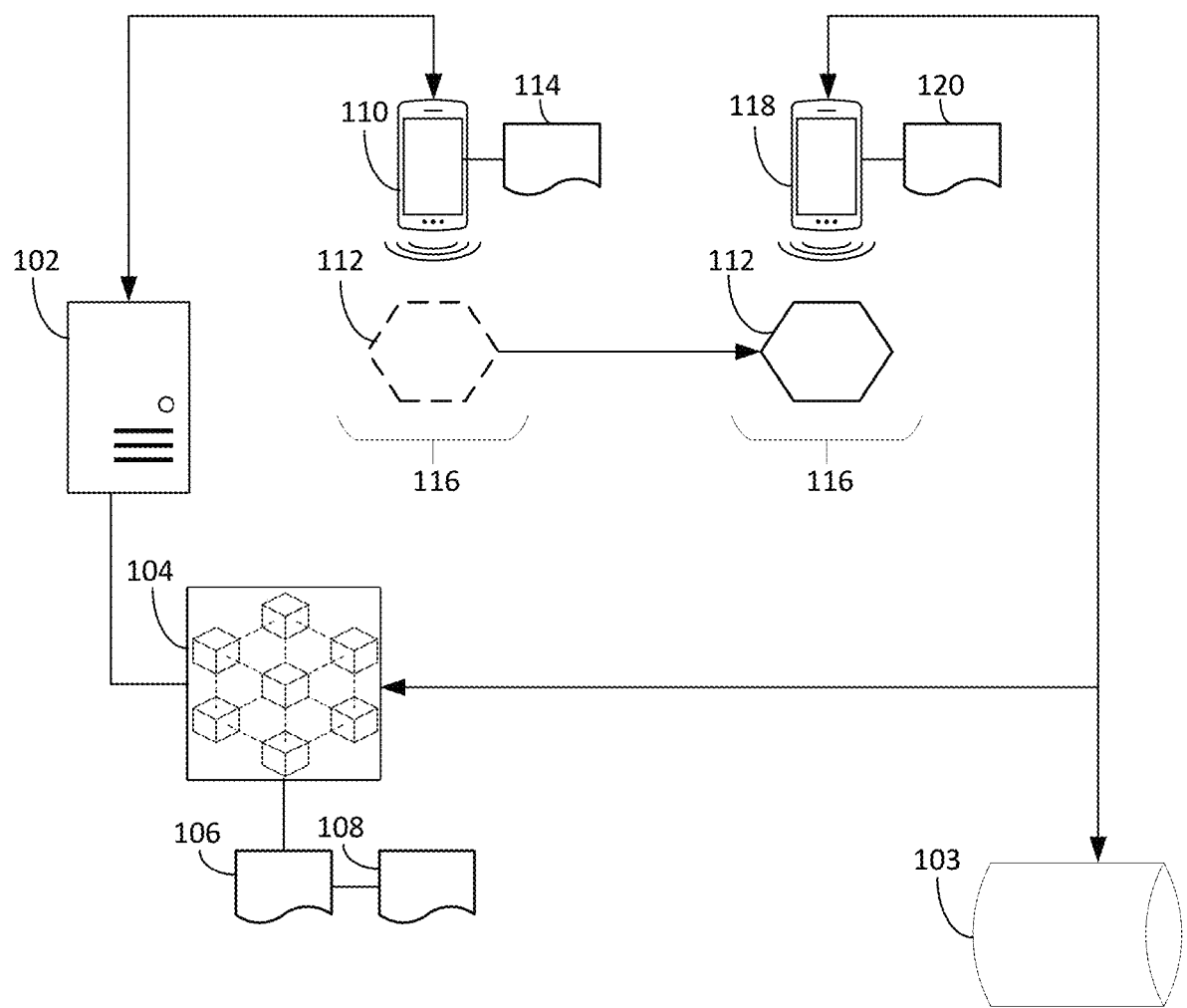
FIG. 1B is a diagram of aspects of the invention.

Referring to FIG. 1B, the second data capture device can be in communications with the immutable storage and database 103. Computer readable instructions on the second data capture device can capture the object data at the second event, retrieve the first event record, compare the object indicia from the second capture device with the object indicia of the first event record and determine if the physical at the second event is the same physical object at the first event. In one embodiment, the second data capture device can store a second event record that can include object indicia capture at the second event on the immutable storage. The computer system can be notified that a second event record has been stored. The computer system can retrieve the first event record and the second event record and compare the respective object indicia to determine of the physical object is the same physical object at the first event and the second event. If the object indicium is not the same, a notification can be provided indicating that the physical object has been changed, modified or otherwise different between the first event and the second event.

Figure 1C:
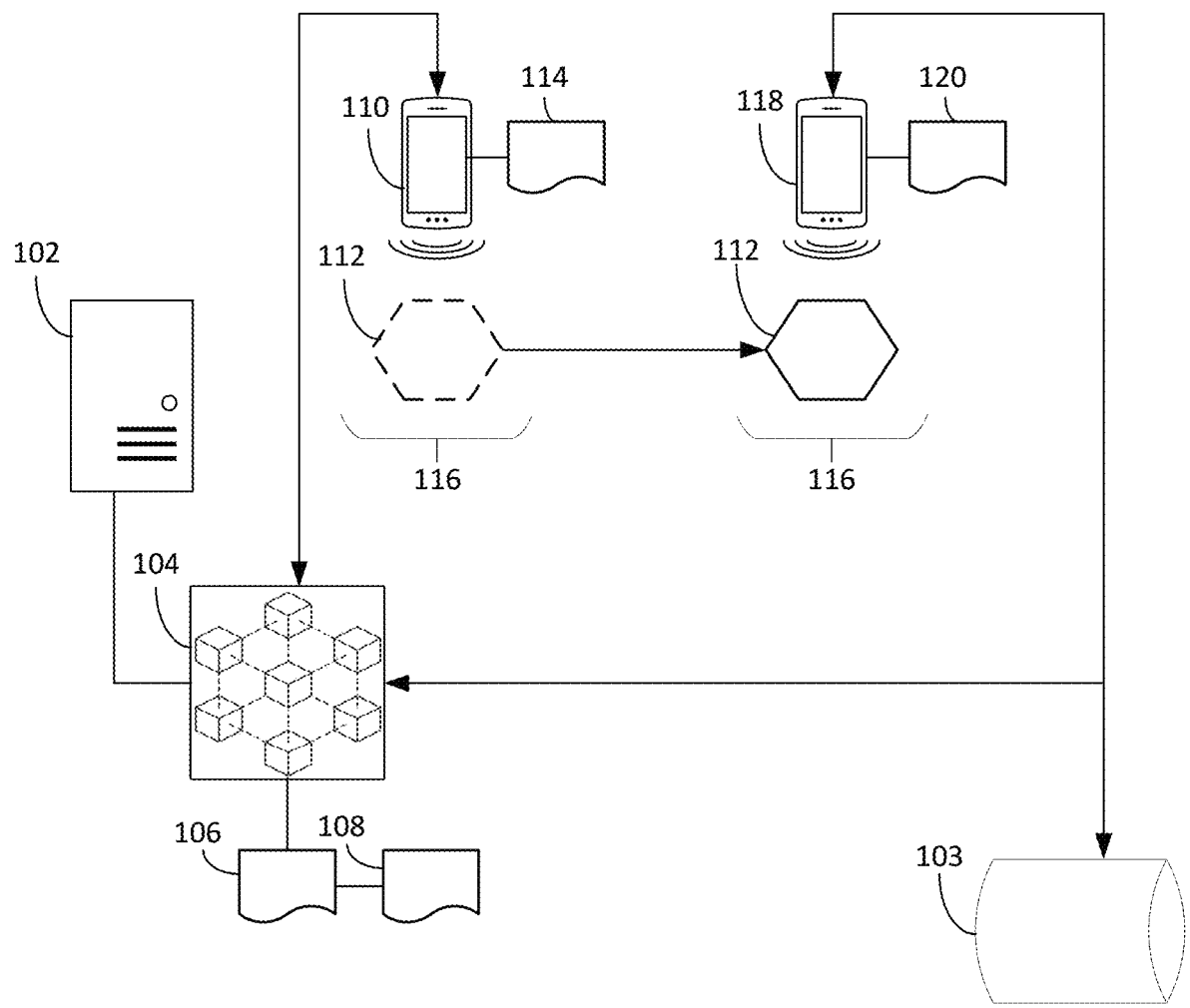
FIG. 1C is a diagram of aspects of the invention.

Referring to FIG. 1C, the first data capture device can be in communication with the immutable storage and database 103. In one embodiment, the first data capture device can capture data at a first event that can include object indicia, create a first event record, and store the first event record on the immutable storage. The second data capture device can retrieve the first record having the object indicia from the immutable storage and compare the object indicia captured by the second data capture device with the object indicia of the retrieved first event record.

The first data capture device and the second data capture device can be the same device.

Figure 2:
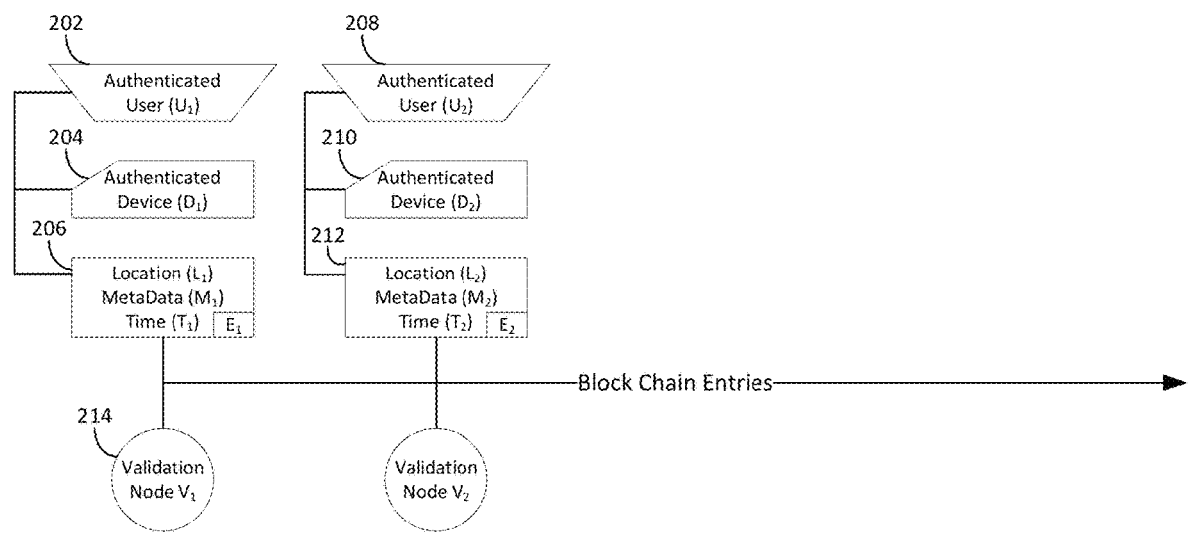
FIG. 2 is a diagram of aspects of the invention.

The system can therefore pair the physical object with a digital representation, such as an object indicium, and verify among events that physical object has not been improperly changed. This system can provide for verifications at each event that the physical object has not been replaced, modified, or otherwise changes. An event record created with this process can have a verification code associated with is so that validity of the event record can be determined Referring to FIG. 2, one embodiment the user of a data capture device can be verified at 202 so that the user can be authorized to use the data capture device or to perform data capture at the first event. The data capture device can be authenticated at 204 representing the data capture device is the correct data capture device and is in working order. The metadata that can be captured by the data capture device can include a location, a time and additional metadata shown as 206. The user can be a first user and in one embodiment a second user of a data capture device can be verified at 208 so that the user can be authorized to use the data capture device or to perform data capture at the first event. A second data capture device can be authenticated at 210 representing the data capture device is the correct data capture device and is in working order. The metadata that can be captured by the data capture device can include a location, a time and additional metadata shown as 212. In one embodiment, the first event record and the second event record can be committed to immutable storage such as blockchain using validation nodes included in the immutable storage structure. A validation 214 can be created and stored. The event record $E_1$, which can be represented by data taken from $U_1$, $D_1$, $L_1$, $M_1$, $T_1$, or other data, can have a validation code $V_1$. When the even record is retrieved, a second validation code $V_{1a}$ can be determined and compared with $V_1$. If these validation codes match or are within an acceptable range, validity of the data from storage to retrieval can be determined.

Figure 3:
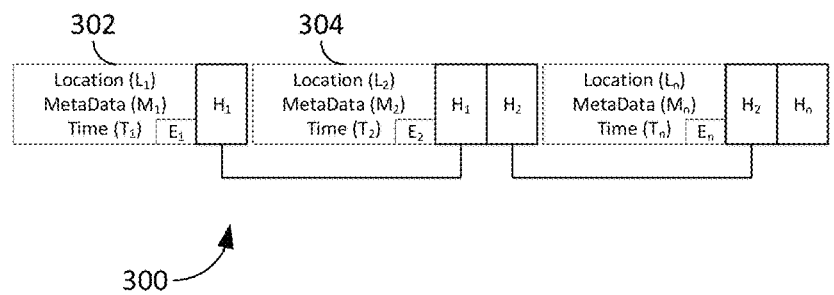
FIG. 3 is a diagram of aspects of the invention.

Referring to FIG. 3, in one embodiment the second event record 304 can be linked to the first event record 302 to create a digital audit trail 300 that includes object indicia verifying that the physical object remains the same physical object throughout a process or where the physical object was modified, changed or otherwise different during the process. A validation record can be created for the first event, the second event, the first plus second event and any combination including the inclusion of n additional records. The system can also record changes in the event or object including changes in the locations, time biometrics of an associated individual, thereby providing an audit trail of the changes.

One example of the invention can include when a material is selected for transport by the supplier, a shipping company can be sent a shipping order representing the material to be transported, an origin and destination. The shipping order can be provided directly to the shipping company or can be retrieved from the immutable storage. Once the shipping company receives the shipping order, it can travel to the origin and receive the material which can represent a first event, and capture data associated with the first event. A first event record can be created representing that the shipping company received the materials and pair the received material with object indicia. In one embodiment, verification that the material is associated with the object indicia can be performed by an individual receiving the material.

Once that material is delivered to the destination, the shipping company can unload the material, a second event, a second verification can occur verify that the material that was delivered to the destination was the same material received at the origin. A second event record can be created representing that the material was delivered and that the material matches the material at the origin and described on the shipping order. The second event record can include the environmental conditions when the material was delivered, delivery notes and the like. The destination can be a receiving entity that can create a third event record representing that the material ordered was received. The receiving entity can use a third data capture device to capture the object indicia and create a third event record. The computer system second data capture device and third capture device can verify that the delivered material matches the ordered material, and that the material has not been modified, changed, substituted, or otherwise different from the origin to the destination.

The receiving entity can use a data capture device that can include biometrics or other indicia to verify that workers using the material are authorized and have the necessary licenses, work certifications, experience, authorizations as well as for verified payroll and insurance coverage. The verification can be through biometric identification devices such as a camera or other image capture device, facial recognition, voice recognition, retinal scans, fingerprint scanners, hand scanners, and other biometric devices. In one embodiment, the computing logic may allow authorized individuals to manually enter the presence of another authorized individual, including on the controller at the project location or through a remote device that can be determined to be at the project location, within a boundary associated with the project location, in proximity to the system. In one embodiment, individuals may be verified and paired with a virtual representation using two-factor authentication.

The receiving entity can be uniquely associated with a location. A location marker can be affixed at the receiving entity and uniquely identify the receiving entity and in one embodiment, a project location. The location marker can be read by a data capture device and provided to the computer system and the immutable storage. In one embodiment, the receiving entity can receive metadata such as a shipping identifier associated with the delivery, including a truck, trailer, pallet, or other container so that the materials are known to be received at the project location.

The computer system can be contained in a housing such as a kiosk and can be physically associated with a project location. The project location can be defined by a boundary representing the perimeter of the physical location. The system can include a sensor and reader which can be selected from the group consisting of radio frequency identification (RFID) detector, ultra-high frequency (UHF) detector, a bar code scanner, a QR code scanner, near frequency communication (NFC) device; Bluetooth beacons, an optical character recognition (OCR) device and any combination thereof. An environmental sensor, such as a weather sensor or weather station, can be in communications with the or included in the housing and configured to record the weather and other environmental conditions at the location and at different times during the project. If the environmental sensor detects a change in the environmental condition, it can represent an event.

The system may record the date and time of events such as the arrival and departure of materials, individuals, workers, supplies, third parties, inspections, and the like to and from the project location, the date and time associated with environmental conditions including weather. The environmental conditions can be used to modify the schedule for workers so that workers are not working during inclement weather, tasks are not preformed outside specified environmental conditions, and materials are delivered and installed during specified environmental conditions.

The system may track the movement of material at a project location or during a process or to and from the project location thereby creating an audit trail associated with the material. Scanning technology such as RFID readers, UHF readers and/or the like may be utilized to assist the location tracking for tools, equipment, materials and even workers. The tracking the material assists with reducing the risk of loss, theft, mis-delivery, and the like. For example, the tracking solution may indicate instances of possible theft, such as when the materials are leaving the project location when the removal of the materials is not proper.

The system may allow for the establishment of one or more geofenced zone that can be associated with delivery areas, worker entrance exit areas, task areas, storage areas, assembly areas, distribution areas and any combination thereof. These areas could be monitored and established with access allowances or restrictions to control movement of material, individuals and equipment to assist with the prevention of loss, mistakes, inefficiencies, and damage. The system can assist with verification that materials stored-on locations are consistent with specifications associated with the materials. A first event can be the material being deposited at a location in a first zone and a second event can be the material being deposited at a second zone. The first event can be associated with the object at a first zone and a second event can be associated with the object in the same zone, at a later time.

The system can also use smart contracts associated with events and stored on the immutable storage that can be self-executing upon satisfaction and verification of contractual terms and objects associated with an event. For example, when an object is delivered from a shipper to the receiving entity and the receiving entity verifies that the object was properly delivered, a smart contract that instigates payment to the shipper can be performed.

Figure 4B:
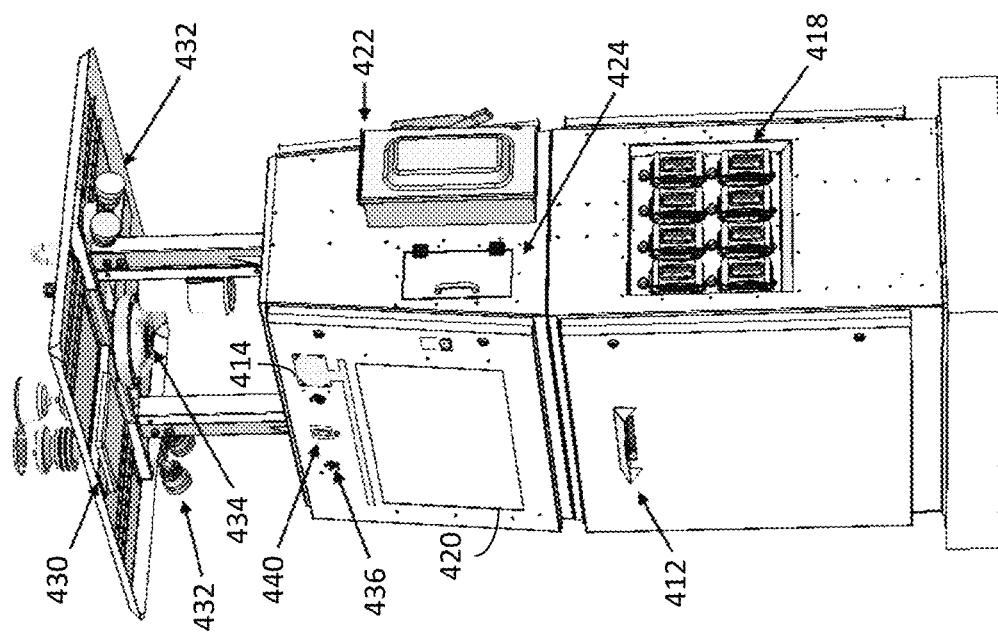
FIG. 4B is a schematic of aspects of the invention.
Figure 4A:
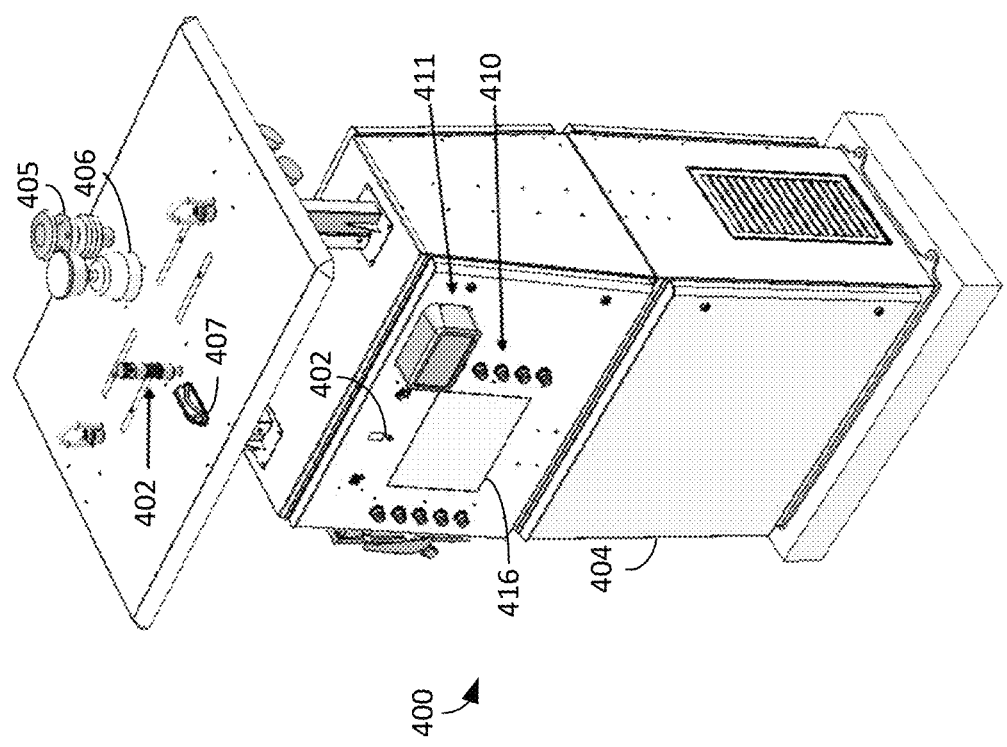
FIG. 4A is a schematic of aspects of the invention.

Referring to FIGS. 4A and 4B, in one embodiment the computer system can be contained in a housing 404 can be physically associated with the project location, virtually associated with the project location or both. The housing can be a kiosk in one embodiment. A unique location marker can be disposed at the project location to uniquely identify the project location. For examples, a transmitter such as a RFID can be associated with the project location by embedding it is a permanent fixture such as a concrete slab, foundation, structure, and the like. The system can read the information from the location marker and associate its actual location with the project location. The location marker can include an alpha, numeric, or graphical information such as a number, letters, barcodes, QR code, physical or geographic coordinates (e.g., GPS coordinates), passive transmitter, active transmitter and the like. Each system can have a unique identifier and each project location can have a unique identifier.

A first side of the system can include a camera 402 for obtaining images of materials, equipment, individuals, or other items entering or leaving the project location as well as images of individuals along a perimeter. The camera 402 may capture biometric images upon which biometric recognition may be performed. Multiple cameras may be placed on or around the housing. The cameras may have biometric recognition and motion detection capabilities. System 400 may include one or more cameras 402 that can be used as biometric-based identification devices to confirm the identity of individuals entering, leaving or on the perimeter of the project location. The system 400 may include an antenna 406 for communicating with a network including a wireless network, Wi-Fi network, Bluetooth, quantum networks, cellular network (e.g., 4G or 5G network) and any combination. The system 400 may include a housing 404 made of suitable weather resistant material, appropriately sealed to protect the internal hardware. The system 400 may include a display 416, such as a touchscreen display, upon which information may be displayed and entered. The display 416 may include an integrated camera that may be used to capture images and that may be used in performing facial recognition of individuals. The display may also include or operatively associate with one or more integrated speakers for providing audio output, a microphone for receiving audio information to facilitate two-way communications to a remote location. The system 400 may include a scanner 412 for scanning items, such as deliveries, as will be explained in more detail below. The scanner 412 may be, for example, a QR scanner, barcode scanner, an Optical Character Recognition (OCR) or another scanner 411 in some instances. Actuators such as button 410 can be carried by the housing and connected to a controller, computer medium, computer of other information processing device. One side of the system 400 can be used for deliveries and inspections. A delivery person may scan delivered materials, equipment, or other items via the scanner 411 or 412 and may interface with the system using the touch screen display 416. An inspector may scan or take images of inspection documents via the scanner 411 or 412 or camera and may interface with the system using the touch screen display 416. In some embodiments, there may be fewer sides in which to interact with the system for all authorized personnel. An overhang may be provided to assist in decreasing glare and protecting some of the items on the housing from the weather.

Another side can include a touch screen display as well as a scanner 412. Display 416 may include or be operatively associated with an integrated camera for capturing images, speakers for providing audio output and a microphone to facilitate two-way communications with a remote location. Still further, this side of the system may include data ports. The system may be accessed to gain access to equipment, tools and to sign in or sign out when leaving or entering the project location, as will be described below.

Another side of the system can include a location 420 where information such as permits, specifications, instructions, tax information, plans, and the like and may be displayed. In some embodiments, the information displayed may assume electronic form so that a video display is provided in the housing. A tax map submap (TMS) number for the project location may be displayed on the housing. Other location identifying information can be displayed such as location number, store number, assembly number, area within the project location and the like. In addition, the site address may be displayed on the system. The site address may refer to both the mailing address for the project location and/or other physically identifying information associated with the location.

Another side of the system can include an access panel 422 may be provided to access a breaker box for the system. An additional access panel 424 may also be provided to access internal components of the system. Still further, access panel 424 may be provided to gain access to power source for providing power at the project location. The access panel 418 may be under programmatic control in some instances to regulate access to the power source. If access is granted, the panel is unlocked, whereas if access is denied, the access panel 418 is locked. In some embodiments, access to the power supply may be controlled by controlling the flow of power to the power source under programmatic control from the controller. These control mechanisms may be used separately or in conjunction.

Referring to FIGS. 4A and 4B, the housing 404 can include a worker side that is configured to be used by a worker at the project location. The housing can include an alarm indicator 407 that can be actuated as described herein. The housing can include a weather station 405 that can include an integrated or separate fluid (e.g., rain) collector. Biometric reader 414 can include an iris scanner, fingerprint scanner, palm print scanner, facial scanner, or some combination. Display 416 can be proximity to input assemblies such as buttons 410. The housing can include a field receiver 430, lights 432 and camera 434. One or more cameras can provide a 360° field of view and include a wireless connection for transmitting images to a remote computer device. The images can also be used for input to the system including input allowing the system to identify delivered materials. The system can include one or more second cameras 440 such as webcams disposed at various locations around the system for capturing images. The lights can include motion activation and photoelectric activation. Speakers 436 can be included to provide audio information to a user, worker, inspector, or other party using or near the system. The audio information can include instructions, alarms, and the like. Power junction can include a shut off switch that can be used in emergency and non-emergency situations. The system can include a secondary power source, such as a battery, so that when the main power is shut off, an alarm can sound, notification send to a remote computer device of other indication that the system or power source has been powered down. The system can include a hand scanner (not shown) that can be protected by a hand scanner access door. A document scanner 412 can be included in the system for receiving physical documents, converting the physical document into a digital representation, and storing the digital representation on the computer readable medium or the immutable storage. The system or housing can include electrical outlets 418 for providing power to various tools and equipment at the project location including recharging batteries. The system can include a wired connection to remote computer devices of a transceiver to provide a wireless connection to remote computer devices.

Figure 5:
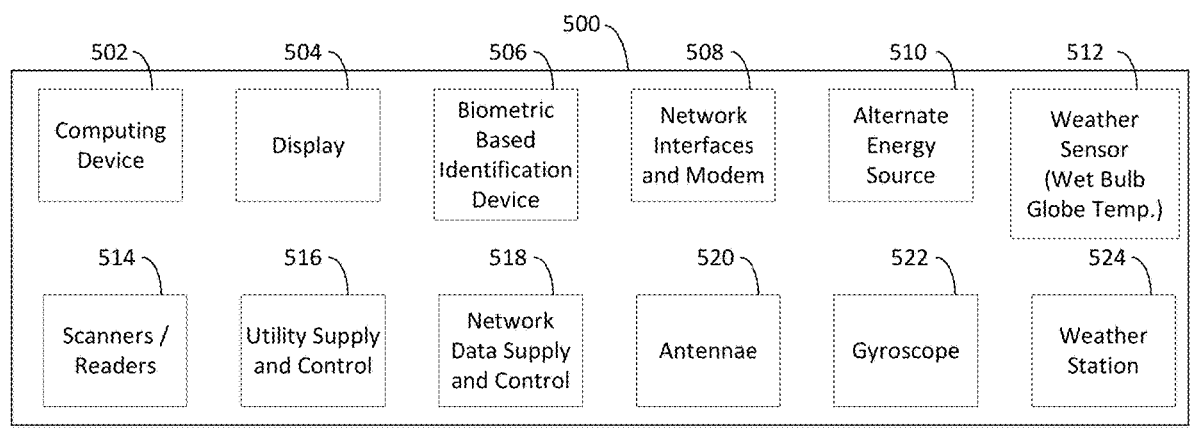
FIG. 5 is a diagram of aspects of the invention.

FIG. 5 depicts components that may be included in the system of exemplary embodiments even when not included in a housing. The system may include a computing device 502. The computing device 502 may take many different forms indicating a desktop computing device, a laptop computing device, a mobile computing device, an embedded system, a smartphone, special computer device, custom computer device, or the like. A display 504 may be integrated with the computing device 502 or as a separate device, such as a liquid crystal display (LCD) device, a light emitting diode (LED) display device or other types of display devices on which computer information may be displayed. One or more biometric-based identification devices 506 may be provided. As will be explained in more detail below, multiple biometric-based identification devices may be used. Network interfaces and a modem 508 may be provided. The network interfaces may interface the computing device 502 with a local area network or a wide area network wherein the networks may be wired or wireless. A modem may be provided to communicate telephonically or over cable lines with remote computing devices.

The system 500 may include various scanners and readers 514, such as those described above relative to housing. The system 500 may include a utility supply and control 516 and a mechanism for turning the utilities, such as power, gas and/or water, on and off under a programmatic control. The system 500 may include an internet data supply control 518 and a mechanism for turning the access to this service on and off under a programmatic control. Programmatic control may be provided to grant or deny access to such resources. The system 500 may include an antenna 520 for wireless communications signals to receive and transmit. The system 500 may include a gyroscope 522 to monitor any moving of the system. The gyroscope 522 may indicate motion indicative of whether someone is trying to move or tilt the housing or other component of the system. Logic may be provided to send a notification in such an event where the gyroscope indicates substantial enough movement. The system 500 may include a weather station 524 to measure current weather conditions, such as temperature, air movement, humidity, precipitation, barometric pressure, direct sunlight, and the like. Input from the weather station 524 may be used to inform decision making by the system in some instances. Alternatively, the weather may be collected via software, such as from a weather service or other weather source. Similarly, the system 500 may include a weather sensor 512. The sensor can be a wet bulb globe temperature adapted to measure, among other things, heat stress in direct sunlight, which accounts for temperature, humidity, air movement (direction and speed), sun angle and cloud cover (solar radiation).

Figure 6:
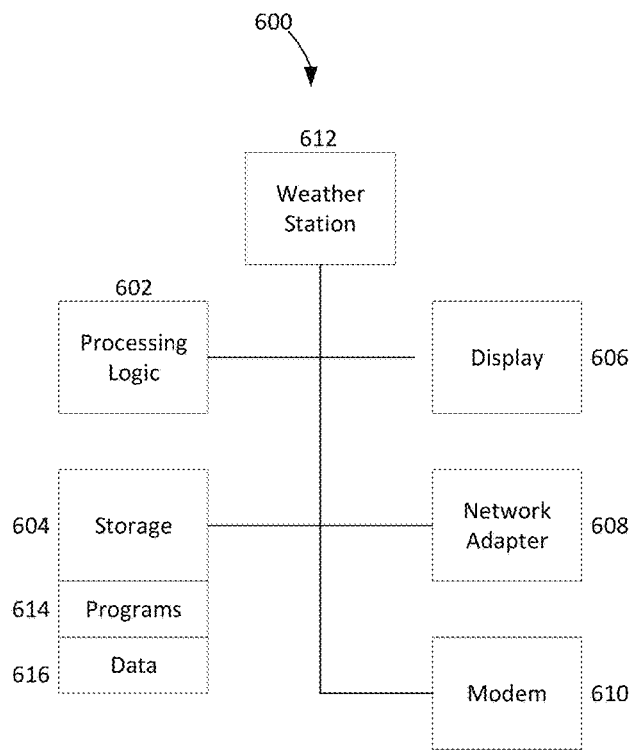
FIG. 6 is a diagram of aspects of the invention.

FIG. 6 shows an example of a computing device 600 for the system. The computing system may include processing logic 602, such as microprocessors, controllers, field programmable gate arrays (FPGA), application specific integrated circuits (ASICs) electronic circuitry, and other types of logic. The processing logic performs the operations of the computing device 602. A storage device 604 may also be provided. The computer readable medium and/or data storage device 604 may take various forms, including magnetic storage, optical storage, etc. Storage capability 604 may include computer-readable media, including removable computer readable media, such as disks, thumb drives and the like, or disk drives, solid state memory, random access memory (RAM), read only memory (ROM) and other types of storage. The computing device may include a display 606, such as an LCD display, an LED display, or other types of display devices on which video information may be displayed. The computing device 600 may include a network adapter 608 for interfacing with networks and a modem 610 for communicating wirelessly, over telephone lines or cable lines with remote devices. The processing logic 602 may use information stored in the storage device 604. In particular, the processing logic 602 may execute programs 614 stored in the storage and may access and store data 616 relative to the storage device 604. The computational functionality of the system described herein may be realized by the processing logic 602 executing the programs 614.

Figure 7:
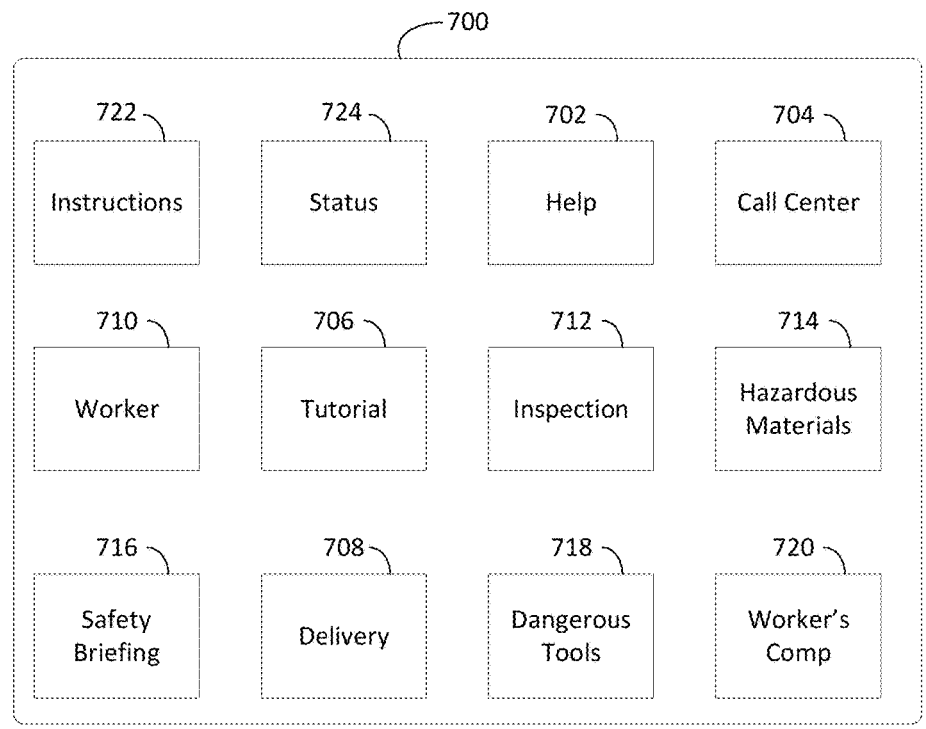
FIG. 7 is a diagram of aspects of the invention.

FIG. 7 shows an example of a user interface on one or more displays. The user interface may include activatable elements. A user may depress these activatable elements or select these activatable elements using an input device, such as a mouse, keyboard, touchscreen, or the like, to activate the components. The display may include a help element 702 that may be activated to obtain help information regarding use of the housing. It may also contain real time project or process plans. It may also include "how to" assistance including videos related to the various projects, stages, processes, and tasks performed at the project location. The user interface on a display may also include a call center activatable element 704. Selection of the call center activatable element 704 may cause a call to be initiated with a call center so that the individual using the system may have a telephone and or video conference with personnel at the call center. The user interface on the display may also include a tutorial activatable element 706. Selection of the tutorial activatable element causes a tutorial to be displayed to teach the individual about operation of the housing.

The system 700 may include software which allows each tool to be coded or assigned to authorized personnel. Each tool can have a verifiably paired virtual representation associating the specific tool with the virtual representation. This can be verified by the system through recognition of the tool from a reader or sensor. The tool supplier record can be created by the tool supplier and include a virtual representation associated with the tool and store the virtual representation paired with the tool on the immutable storage. When the tool arrives at the project locations, the system can retrieve the tool supplier record and determine of the tool requested if the actual tool that arrived. A tool verification record can be created and stored on the immutable storage representing that the tool delivered and received matches the tool supplier record. Shipping or delivery company personnel may activate the delivery activatable element. This causes a delivery functionality to be displayed where delivery notes may be added and where information may be gathered from the delivery person regarding a particular delivery.

An inspector activatable element 712, may be activated to cause the inspector functionality to be activated. The inspector functionality may enable an inspector to add inspection notes, provide electronic inspection certificates and the like. The system can provide reports that can be automatically generated from the existing data described herein as well as notes manually added during the construction process. The reports can be generated at predetermined times such as daily or upon completion of specific tasks.

Figure 8:
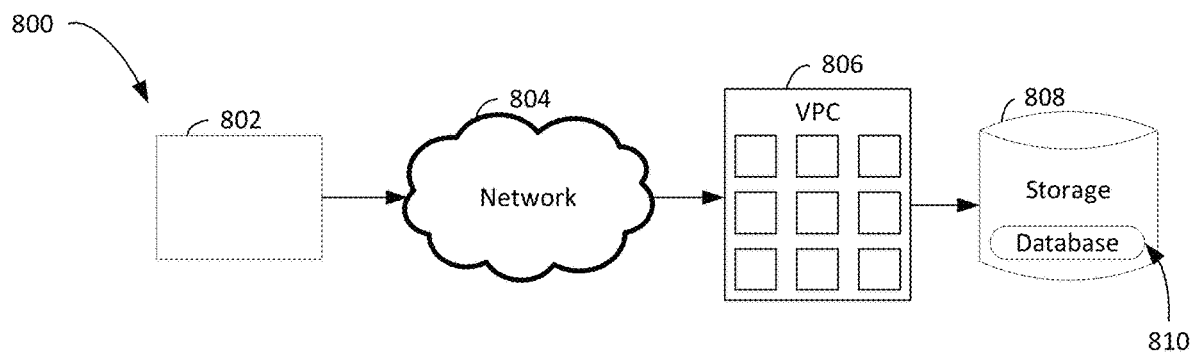
FIG. 8 is a schematic of aspects of the invention.

As shown in FIG. 8, the exemplary embodiments may be implemented in a decentralized computing environment 800, that may include distributed systems and cloud computing. FIG. 8 shows one or more systems 802 that may be in communication with a remote cluster 806 via a network 804. The cluster 806 may store information received from the system 802 and provide added computational functionality. The network may be a wired network or a wireless network or a combination thereof. The network 804 may be a secure internet connection extending between the system 802 and the cluster 806, such as a virtual private cloud (VPC). The server may be a computing device and can be in communications with the site computer device. The cluster 806 may include access to storage 808. The storage 808 may include a database 810 in which information regarding a project location is stored in a consistent manner.

Figure 9:
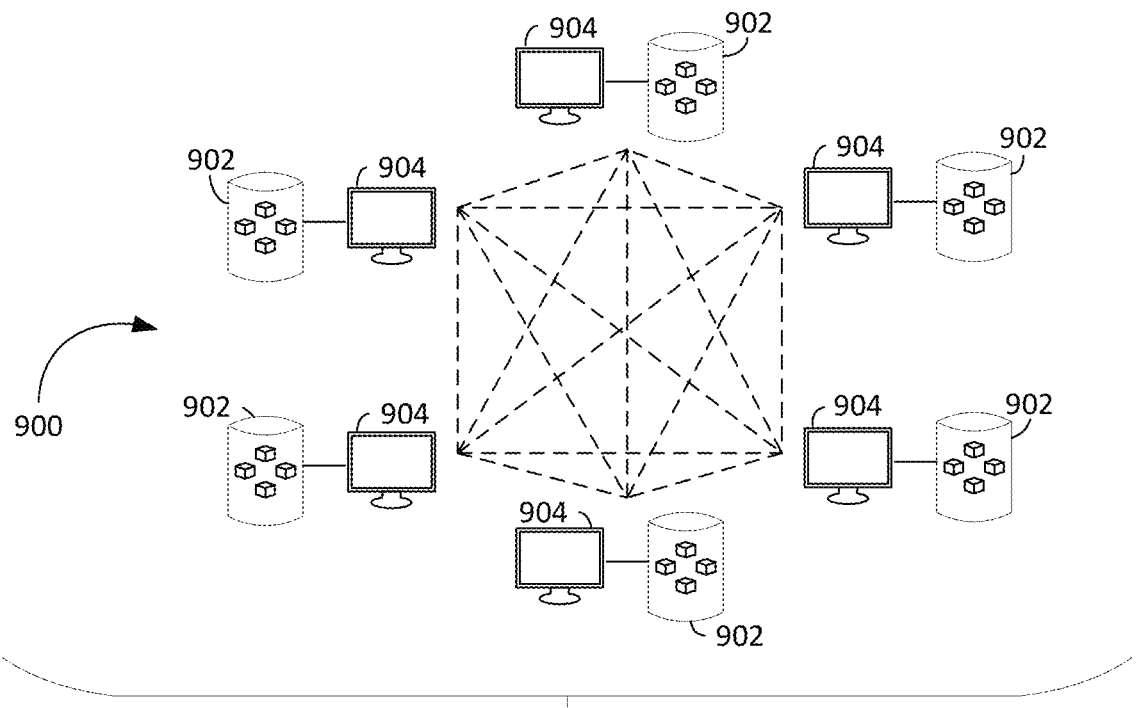
FIG. 9 is a schematic of aspects of the invention.

FIG. 9 shows diagram 900 of an example of a peer-based network where an immutable storage 902 is broadcast and shared among the nodes 904. This network may be resident in the VPC cluster 806 (FIG. 8) or in a network for example. The nodes 904 may represent computing resources, such as server computer systems or other computing systems, residents at the parties identified in FIG. 9, for example. Each node that has access to a copy of the immutable storage 902.

The various computer devices, including the server and site computer device (e.g., system, controller, and any combination), can be in communications with immutable storage. The immutable storage can include a distributed ledger, immutable database, block-chain structure, and the like. The communications between the various computer device, including the server and the site computer device and immutable storage can be a global communications network, wide area network, or local area network, delivered to a computer readable medium from one device to another (e.g., USB drive, CD, DVD) and can be wired or wireless.

Figure 10:
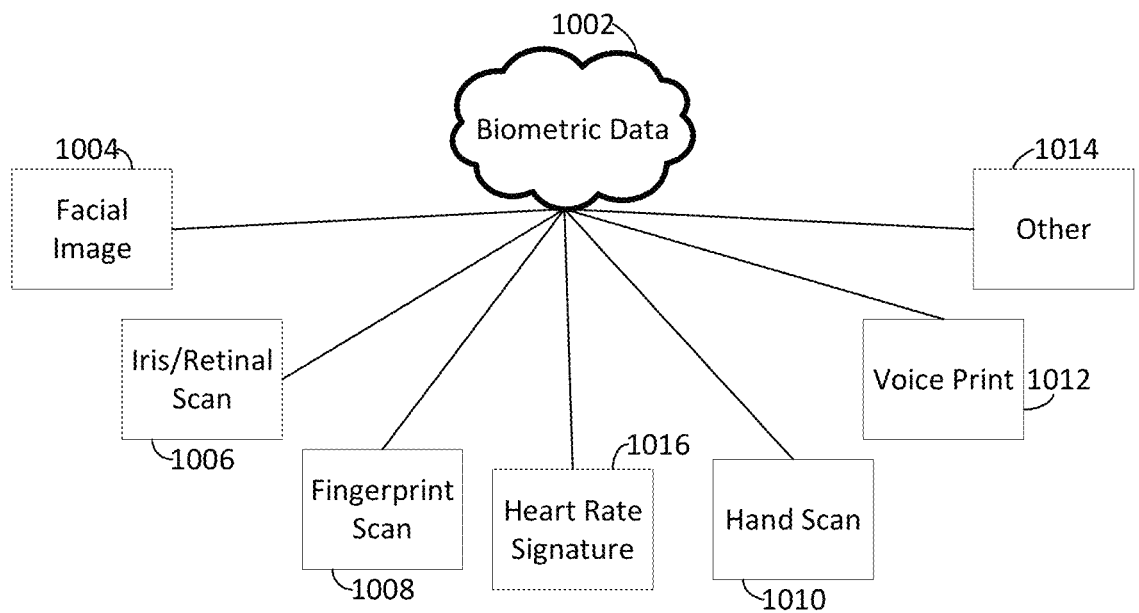
FIG. 10 is a diagram of aspects of the invention.

Referring to FIG. 10, the of biometric data 1002 that may be obtained by biometric-based identification devices at the project location to attempt to identify individuals. Biometric data may include facial recognition 1004, an iris/retinal scan 1006, a fingerprint scan 1008, a hand scan 1010, a voice print 1012 or heart rate signature 1016 or other input or sensor 1014. It should be noted that other types of biometric data may also be used in exemplary embodiments to help identify individuals uniquely. Also, an individual may be required to provide multiple types of biometric data in some instances.

Figure 11A:
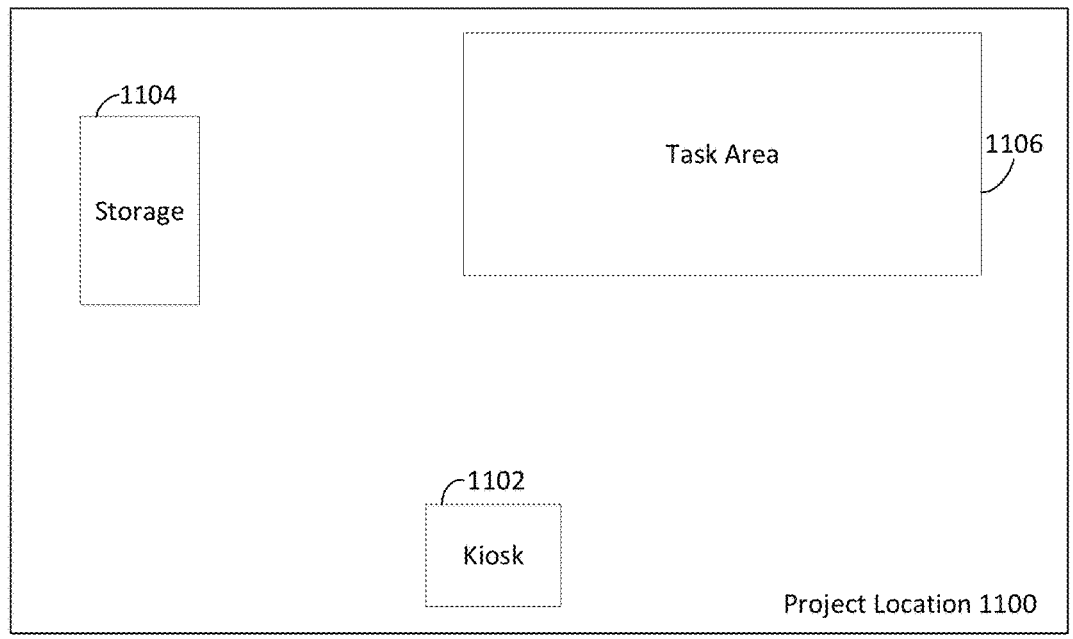
FIG. 11A is a schematic of aspects of the invention.

To help illustrate an example of geofencing, FIG. 11A shows an illustrative project location 1100. The project location 1100 may include a housing 1102 for the system as well as storage location 1104 that can be a building, trailer, shed or the like. The storage location 1104 may hold tools, equipment, wearables and/or materials. The project location 1100 may also include a task location 1106. The task location may be where tasks are performed using materials to produce a good or offer a service.

Figure 11B:
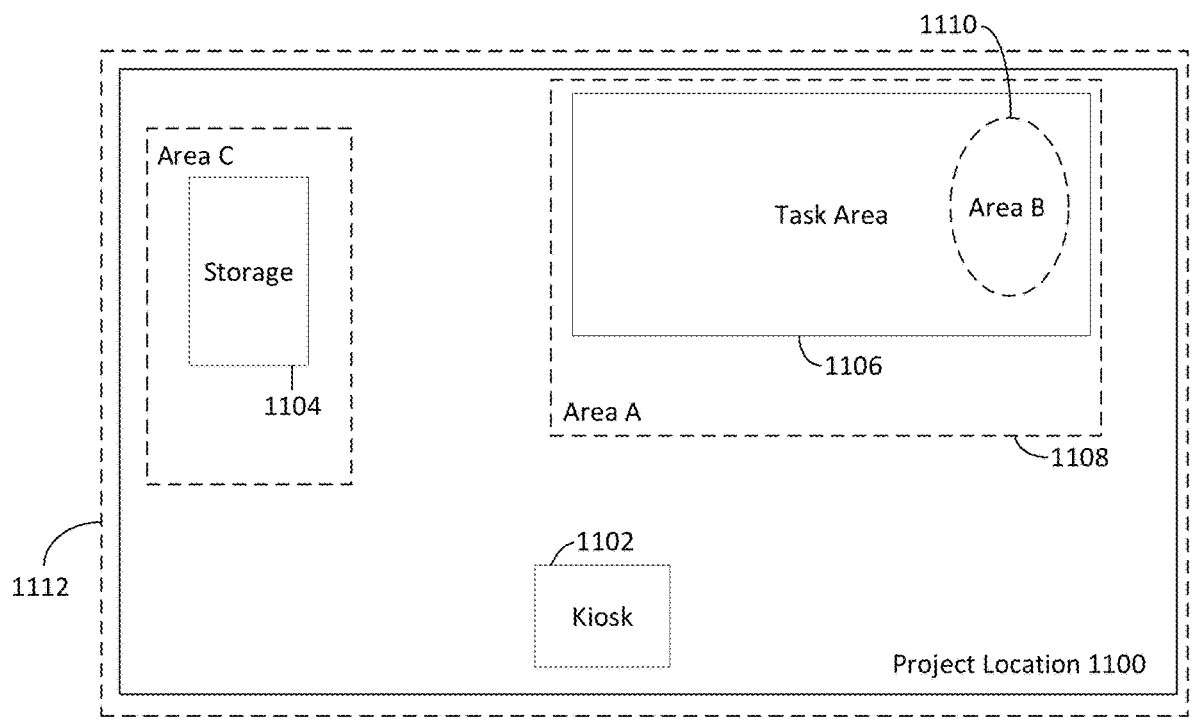
FIG. 11B is a schematic of aspects of the invention.

FIG. 11B shows an example of different areas that may be established for geofencing at the project location 1100. Area A shown a boundary 1108 may include the entirety of the project that is under construction. Area B 1110 may be a portion of the project, such as the kitchen. Another area may be a shed and another area may be the entire project location. Individuals may have access to none of these areas or to a subset of these areas, including all areas.

Figure 12:
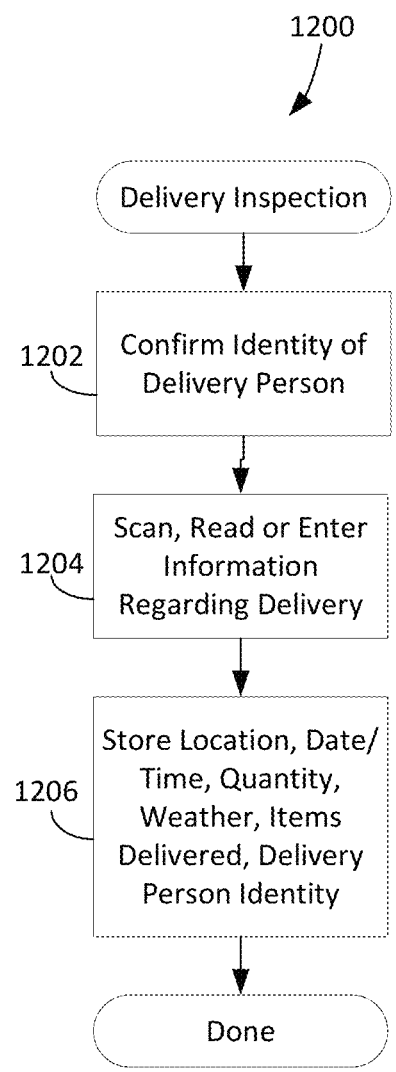
FIG. 12 is a schematic of aspects of the invention.

Referring to FIG. 12, the system may track the location of equipment, tools, or materials at the project location 1202. The tracking can be automated or performed by an individual. This task can serve as a type of inspection that can also verify that the physical object is the same as the digital representation. The system can check whether the location of the equipment, tools or materials is acceptable or not 1204. For example, suppose that lumber has been delivered to the project location and the location of the lumber indicates that the lumber is removed from the project location. This would be problematic and would warrant a response. If the location is not acceptable as checked in 1604, a response is generated in 1206. The system helps manage deliveries to the site. Initially, the identity of the delivery person can be confirmed to indicate that the delivery person is the appropriate party and is permitted access to the project location. For example, a serial number or other identification indicator may be scanned or read off the delivered items. In addition, information may be entered by the delivery person using the housing, such as by entering information via display, screen of other input. The location of delivery, the date of delivery, the time of the delivery, the quantity of the delivery, the identity of the delivery person and the weather may be recorded as part of the information that is kept regarding the delivery. This information can be used to track and confirm deliveries as well as to understand the conditions when the delivery was made.

Figure 13A:
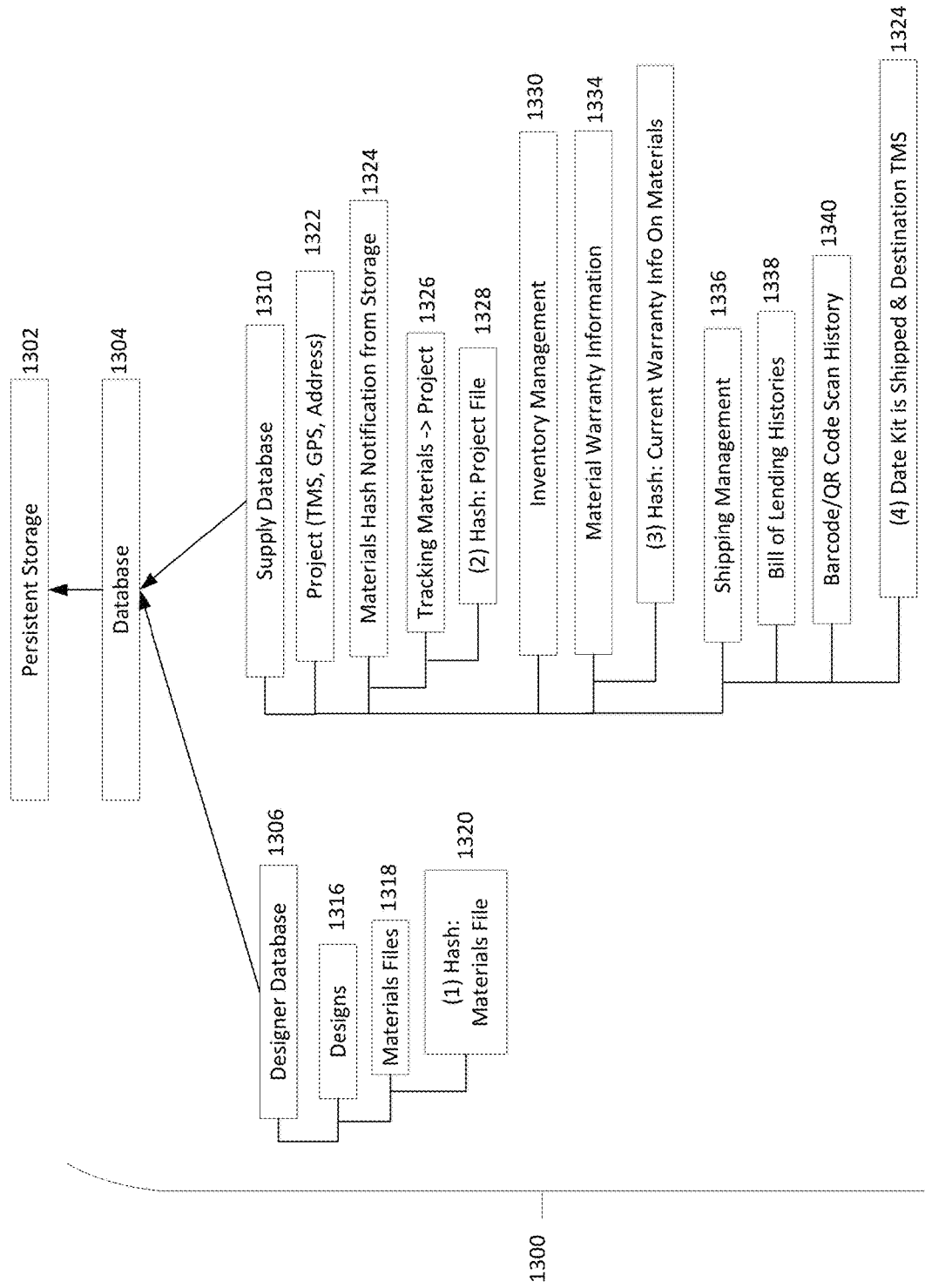
FIG. 13A is a schematic of aspects of the invention.
Figure 13B:
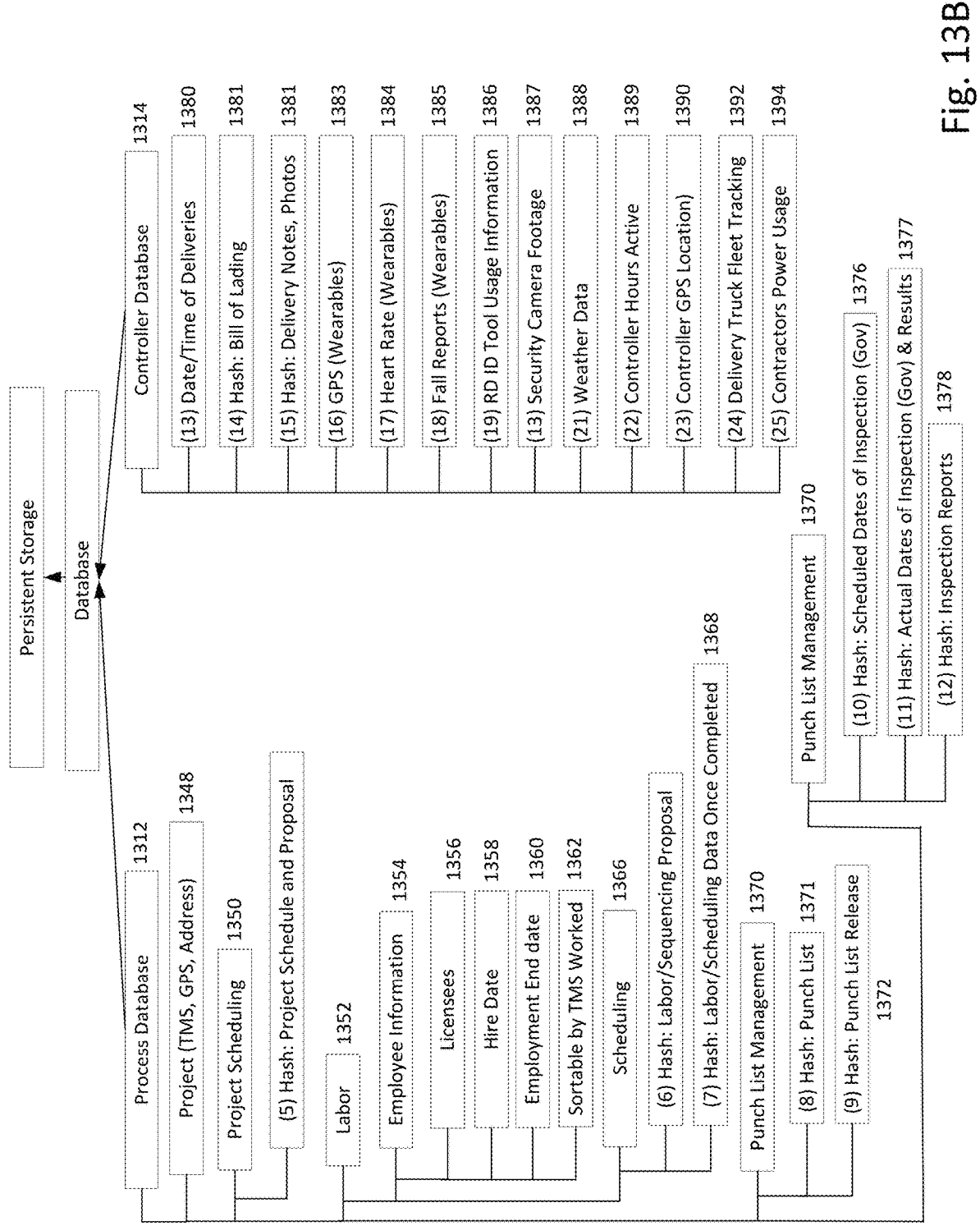
FIG. 13B is a schematic of aspects of the invention.

FIGS. 13A and 13B also show a supply company database 1310. The supply company database may hold project information 1322, such as tax map submap (TMS) numbers, GPS data and addresses for project or process properties. The supply company database 1310 may store a material requirement record hash notification 1324 from the immutable storage 1302, indicating that the hash value for the material requirement record has been referenced on the immutable storage 1302. Information 1326 tracking the material requirement record may be stored in the supply company database. As was discussed above, the supply company may analyze and process the design to develop the material requirement record for the project or process. A hash value 1328 resulting from passing the design file through a secure hash function is stored in the supply company database 1310, transferred to the management company database 1304 and referenced on the immutable storage 1302.

The supply company database 1310 may also store inventory management information 1330, such as quantity and the particulars of material inventory and material warranty information for such materials. The warranty information for materials used in the project may be hashed into a value 1334 and the resulting hash value may be stored in storage in the supply company database 1310. The hashed value 1334 may be passed to the management company database 1304 and then referenced on the immutable storage 1302. The supply company database 1310 may also store shipping management information 1336. This may include bill of lading histories 1338 and barcode, RFID values, UHF values and/or QR code scan histories 1340. The material list (such as a bills of lading) for an assembly project and the barcode/QR scan codes for delivered items for the projects may be hashed and the resulting hash value(s) passed to the management company database 1304 for reference on the immutable storage 1302. Further, confirmation of what was specified by designers was delivered to the project location and installed according to the manufacturer's specifications so that a project or process can be placed under warranty.

An assembler database may store project information, such as TMS #'s, GPS data and addresses for projects. The assembler database may also hold scheduling information 1348 for the project. This may include detail regarding workflow and timing. A hash value of the project schedule 1350 may be stored on the assembler database, passed to the management company database 1304 and referenced on the immutable storage 1302. The assembler database may store worker information 1352. The worker information 1352 may include employee information 1354 for workers involved in projects. This employee information 1354 may include information regarding licenses for workers 1356, hire dates for workers 1358, employment end dates for workers 1360 and other information, such as names, photos, etc. The worker or laborer information can include information that the worker or laborer is in compliance with applicable laws (including federal and state), in compliance with contractual obligations, properly licensed, of legal status, of sufficient experience, within application restrictions such as a limit on hours worked during a 24-hour period, authorized for the project location and any combination. The worker or laborer information may be sortable by keys such as TMS # to identify workers for a project. The assembler database 1312 may also store scheduling information for workers. This information may be used to develop a worker/sequencing proposal that is hashed 1366 and the resulting hash value stored in the assembler database 1312. The hash value 1366 may be passed to the management company database 1304 and referenced on the immutable storage 1302. Worker sequencing data once the labor is completed, the information may be hashed and the resulting hash value stored in the assembler database 1312 for a project. This hash value 1368 may be passed to the management company database 1304 and referenced on the immutable storage 1302.

Punch list management information 1370 may also be stored in the assembler database 1312. The punch list management information 1370 may include a hash of the punch list for a project and a hash of punch list releases for a project 1372. These hash values 1371 and 1372 may be passed to the management company database 1304 and referenced on the immutable storage 1302. The punch list information can be used for a determination of warranty requirement compliance.

The deliveries may utilize various scanning and reader technology. A machine vision system may be provided. The machine vision system may capture an image of the delivered items and process the image to determine the nature of the items that were delivered as well as the quantity of items. Moreover, the machine vision system may capture an archival image that may be indicative of the state of the items when they were delivered. A QR code scanner may be used where QR codes are on a delivered items or documentation. Similarly, a bar code scanner may be used where bar codes are on the items or on documentation delivered with the items. Still further, an RFID reader may be provided to gather information regarding the delivered items.

The inspector may interface with the system and preform steps that may be performed in such an interaction. Initially, the identity of the inspector may be confirmed using the biometric data or manually using the touchscreen on the system. The inspector then performs the inspection of the appropriate portion of the project location. The inspector then accesses the system, such as through the system at. The inspector then may record notes and/or post certificates or notices at the system. Additionally, the inspector may use technology available via the system such as OCR scanner or the like to capture appropriate information the inspector may have written during fulfillment of the reason for being on the site.

Systems at adjacent locations may be used in conjunction with each other. For example, in the event that there are multiple smart indicia on one or more physical objects, the proximity of the indicium to each other can be used to verify the status, disposition and location of the one or more physical objects. In one indicium moves a certain distance from another, it can indicate a change in status that can be associated with an event record and the physical object.

The steps that may be performed by image capture devices, such as still cameras or video cameras, from multiple adjacently situated systems can be used in conjunction. Video feeds or still images may be obtained from the image capture devices from multiple systems. The video feeds or images may then be processed, such as by the cluster described above, using software such as motion detection software, thermal image analysis or other image analysis software to identify activity that may warrant a response. When a motion is detected, it can trigger data capture for that event.

As has been mentioned above, a great deal of information may be collected and stored during the project, process of task for reference during or after the project, process or task is completed. The information obtained during the project from many different sources may be stored on or referenced from immutable storage. The information may be stored on an ongoing fashion, in databases as described below, and may be referenced in an immutable persistent fashion on the storage. This information may help resolve disputes between parties involved on the project or process. For example, suppose the assembler asserts that the wrong items were delivered. Since there is a complete record references on the immutable storage of all deliveries, these records may be accessed to resolve the dispute. Insurance providers may access injury records referenced on the immutable storage to settle or confirm claims. Disputes regarding pay among workers may be resolved by checking the recorded hours on site to determine the appropriate pay for the workers. Inspection records may be accessed to confirm that proper inspections were carried out and passed.

The information referenced in the immutable storage may also be accessed from a computing device of an owner, end user, customer, integrated and the like at. The computing device may be, for example, part of a home maintenance system that manages and controls home systems, such as heating, air conditioning, lighting, an alarm system, or the like. The computing device may be part of a smart home controller and may interface with appliances and other items that are interconnected via a home control network. The computing device may include a document management system for securely storing the transferred information. The computing device may be a facilities management system, or operations system associated with the project location.

Items may be affixed, such as barcodes, QR codes, RFID identification, Bluetooth beacons and/or UHF identification when the items arrive at the supply company. Stickers may be affixed to the items to associate the codes with the items. The items in each package may be scanned to record what items are included in the packages. The packages may be wrapped as needed and a QR code sticker may be affixed to the outside of each package. The QR code for each package is scanned. The process may then generate a material list for each delivery.

Interactions relating to a smart contract for the project or process can be implemented using the system. For example, suppose that the supply company makes a delivery to the project location. Further suppose that the delivery is confirmed by information such as that gathered by the system as discussed above. The lender then releases payment to the supply company. Payments can be made through third party funding, factoring, credit lines, loans, or other financial option to assist with financing and cash flow management.

The payment may be made electronically, such as through crypto currencies, like Bitcoin or Ether, or via a stable coin whose value is pinned to an item like a paper currency or the like. A cryptocurrency is a digital currency built with cryptographic protocols that make transactions secure and difficult to forge. Other Suitable forms of electronic payment includes Automated Clearing House (ACH) payment, Electronic Funds Transfer (EFT), card payments, other types of bank transfers or other types of electronic wallet transfer. In the case where crypto-currency is used, the crypto-currency may be delivered to the digital wallet of the supply company at a specified wallet address or account. The ledger may be updated to show that the contract is complete. Payment requires that the lender has sufficient funding in their digital wallet. If not, the smart contract will not be written on the immutable storage. If there is sufficient funding, payment is made, and the contract is written onto the persistence storage as complete at 3320.

There can be a relationship between the smart contracts and the project, process, or event. Initially, a schedule can be received. For example, the assembler can create the project schedule based in part on the design and material requirement record. Based on the project schedule, smart contracts may be constructed that use the immutable storage for contractual arrangements associated with the project or process. The smart contracts are implemented in software and in this case are used to provide electronic payments to parties for activities relating to the project or process using, for example, electronic payments, crypto currencies, fiat currencies and other forms of payments. The smart contracts may specify the conditions required for payment and may specify the amounts of payment. Smart contracts may also play a role with deliveries. Delivery and/or materials information is obtained regarding delivery to the project location for the project or process. The information obtained can include if the materials delivered match the material requirement record, manufacturer, and/or supplier which can be confirmed by multiple parties.

The delivery information is hashed, and the resulting hash value is referenced on the blockchain-based immutable storage. A smart contract is provided that uses the immutable storage. A determination is made whether the conditions specified in the smart contract are satisfied. If the conditions are satisfied, electronic payment for the delivery is realized. If the conditions are not satisfied, notice of outstanding issues are sent and the delivery worker may attempt to remedy the issues. The process may then repeat beginning with step until the conditions are satisfied.

To pair a material with its virtual representation the system captures events at various points of transition of the material. Pairing the physical material with the virtual representation can include several elements or components. Included in the pairing process can be the physical observation of the physical material and then associate the physical material with a virtual representation so that the physical material is properly associated with the virtual representation. This verification provides trust that the virtual representation is accurately associated with the physical material as a factor rather than simply trusting that the virtual representation is accurate. This system can use manual or automated processes to physically observe the material and associate the material with the virtual representation during various events from raw material to final deliverables. Verification can also use the metadata that is associated with the interaction of physical items by individuals and electronics when the item is created, transported, installed, activated, and destroyed. The metadata that can be captured and placed into immutable storage can provide stakeholders an audit trail of history for their physical asset using a verified paired virtual representation. A similar process as described herein can be used for pairing a biometric identifier with an individual.

For example, when raw material is harvested, a harvesting record can be created that captures the harvesting event and can include metadata concerning the event and verification that the raw material is associated with the harvesting record. For example, a digital image of the raw material can be captured, and the images and its metadata of the image captured can be included in the virtual representation. The capture device and its metadata can also be captured and included in the harvesting record. For example, a sensor having a GPS transponder, camera and transceiver can be used to capture the harvesting event. The metadata of the harvesting event can include date, time, location (e.g., GPS coordinates), harvesting image, harvesting entity, harvesting worker, harvesting equipment and any combination. Once harvested, raw material can be loaded on a transport (e.g., vehicle, plane, ship, and the like). By capturing the harvesting event and verifying that the raw material and the virtual representation are paired, and stored on the immutable storage, the physical material and the virtual representation are paired allowing for reliance upon the digital record to accurately represent the physical material.

In one embodiment, the verification of the physical object can be performed using the weight or dimensions of the physical object captured throughout a process. The weight and dimensions can be combined with one or more images of the physical object where the capture device can be a scale, scanner, or other device. The capture device can be a combination of a camera and scale to provide for data streams during the process and at and between events.

By verifiably pairing the physical asset with a virtual presentation, the risk of unintentional or impermissible rehypothecation can be reduced or eliminated. The paired asset can be verified by multiparty chronological metadata streams that can be associated with a physical location. Because verifications using these streams are chronological, altering the information could require alteration of the metadata prior to and after the altered record. Therefore, the altered record would be inconsistent with the associated records potentially both temporally and geographically and an attempt to alter the record would be discovered. The use of an immutable storage further reduces the risk of alterations of records as well as increasing the verification of information. Further, pairing assets associated with the event, involving the asset, interactions with the asset and the associated metadata provide for a substantiated digital asset, reduce, or eliminate risk and improve capital efficiency. Further, the pairing of assets facilitates commerce by allowing electronic transactions with assurances that the virtual representation used in the electronic transaction is paired with the physical asset.

Verification, including verification of an event, can include verifying that the physical material and the virtual representation match and can be accomplished in a variation of methods including interaction with identification elements such as a tag, label, and the like, capturing an image of the material, capturing a video of the material, capturing indicia such as a tag physically affixed or otherwise associated with the material, human visual inspection, weight measurements at and between events, capturing the dimensions of the physical object at and between events, and any combination. Identification of an individual performing or otherwise associated with an event can be captured by identification devices (e.g., cards, tags, RF ID. smart dust, beacons) and biometrics including visual capture (e.g., facial recognition), voice recognition, iris scan, fingerprint, palm print and any combination.

The system can retrieve the harvesting record, receive verification that the raw material delivered to a shipper is the same that was harvested and create a shipping record. A verification that the physical material and the retrieved virtual representation match can be performed using a capture device, worker verification and a combination. The metadata associated with delivering the raw material to the shipper can be captured and included in the shipping record. The shipping record can include information about the shipper and the worker delivering the raw material to the shipper. The shipping record can include information about the destination of the raw material. By capturing the shipping event and verifying that the raw material harvest delivered to the shipper and the virtual representation are paired, and stored on the immutable storage, the physical material and the virtual representation are paired from harvesting the delivery to the shipper allowing for reliance upon the digital record to accurately represent the physical material and its disposition.

The system can retrieve the shipping record, receive verification that the raw material delivered by the shipper to a processor (e.g., manufacturer), is the same that was harvested, shipped, and received. The metadata associated with delivering the raw material to the processor can be captured and included in a delivery record. The delivery record can include information about the shipper, processor, worker and any combination. The delivery record can include information about the processor, location, and other information. By capturing the delivery event and verifying that the raw material harvest delivered to the processor and the virtual representation are paired, and stored on the immutable storage, the physical material and the virtual representation are paired from harvesting the delivery to the processor allowing for reliance upon the digital record to accurately represent the physical material and its disposition.

Once the processor processes the raw material to form a processes material, the system can create a processor record including that the raw material delivered to the processor is integrated into a processed material and is the same raw material that was harvested, shipped, and received. The metadata associated with processing the raw material can be captured and included in a processing record. The processing record can include information about the harvesting, shipping, processor, worker, and any combination. By capturing the processing event and verifying that the raw material harvested delivered to the processor and the virtual representation are paired, and stored on the immutable storage, the physical material and the virtual representation are paired from harvesting to processing allowing for reliance upon the digital record to accurately represent the physical material and its disposition.

Once processed, the processed material can be further shipped to be included as a component in another material. For example, the raw material can be aggregates, rocks, Portland cement and water. The processed material can be concrete. When an article (material) is made from the concrete, the article can be associated with a virtual representation that allows pairing of the article with the raw material and the events through the article process. Therefore, the physical article and the virtual representation are paired from harvesting to article creation allowing for reliance upon the digital record to accurately represent the physical article (material) and its disposition.

Referring to FIG. 14A through 14E, a designed 1402 using a computer system can create a material list 1404. The materials list, along with other design requirements, can store the information on persistent storage 1400 A user of the supplier computer system 1410, can select or otherwise acquire an object such as material 1416 identified on the material list from a materials requirement record or designer record that can be retrieved or otherwise received by the supplier computer system from the immutable storage. The supplier can verify that the material matches the material requirement record, and the system can capture this event. For example, one method of associating the physical material with a virtual representation is using a indicia 1420a ($I_1$) placed on the material. The indicia is then physically verified to be associated with the material from the material list or the material requirement record. Therefore, the physical material and the virtual representation ($V_1$) are paired by recording this event and associating the physical material, $I_1$, and $V_1$. In one embodiment, the indicia can include the following information:

| Description | Digits | Information |
|---|---|---|
| Locations | 19-20 | GPS XX.XXXXXX XXX.XXXXXX |
| User ID | 8 | SSN XXXX + Initials XX + Gender X |
| Date | 10 | XX/XX/XXXX |
| Time | 7 | Zulu XXXX:XX |
| Material | 12 | UPC/Barcode XXXXXXXXXXXX |

An event record such as a supplier record 1418 can be created and stored on the immutable storage. The capture event can include a unique number and include the supplier ID, date and time, location, material ID, status, and any combination. The material ID can be from an original manufacturer or the supplier. The status can include that the material has been gathered, packaged, ordered, is in stock or on back order, shipping information and any combination. The shipping information can include the origin, destination, shipping instructions, shipper, and any combination.

A shipper can retrieve shipping information from the immutable storage identifying the material location, load, destination, pick time, delivery time, and other information concerning the shipping of the materials. The shipper can verify that the physical materials being retrieved from the supplier match the virtual representation of the supplier record. If the materials are verified, the shipper can physically capture the event, for example, by affixing its indicia 1420b ($I_2$) to the materials representing this verification. A supplier shipping pickup record 1424 can be created and stored on the immutable storage. The supplier shipping pickup record can include project, shipper, material, status, date, time, location, and any combination. The mode of transportation of the material can also be tracked and stored on the immutable storage. For example, if the shipper uses a vehicle, the date, time, location, and other metadata associated with the vehicle can be gathered along the route and stored on the immutable storage. Verification can be provided using the metadata of the various events. For example, if the date, time, and location of the supplier record is within a certain range of values of the date, time and location of the supplier shipping pickup record, there will be verification that the proper materials were physically transmitted from the supplier to the shipper.

The shipper can deliver the material to the destination such as a project location. When the shipper delivers the materials to the project location, the shipper can capture this event by creating a supplier shipping delivery 1428 record using a shipper computer system. The shipper can verify the event by methods including adding a indicia 1420c ($I_3$) representing that the proper materials were delivered to the proper location. The project location computer system 1432 can be used to verify that the materials were properly delivered by retrieving the material record 1430 from the immutable storage and using the record to match the physical materials delivered. In one embodiment, the shipper can use the tags that are part of the virtual representation to match $I_3$ with the material and the information stored on the immutable storage to capture and verify the event. When the material is delivered, the project location can use a project computer system 1432 to retrieve the material record from the immutable storage and match the material delivered with the material record. The project location can add an indicia 1420d ($I_4$) to the material to capture this event. The project location can create a project location material received record 1434 that can include the project, material, virtual representation ($V_4$), status, date, time, location, other metadata, and any combination. The shipper, worker at the project location, or both can physically inspect the material and verify that it is matches the virtual representation stored on the immutable storage. This verification can be included in the information that is stored on the immutable storage by the shipper and a worker or system at the project location.

Figure 14A:
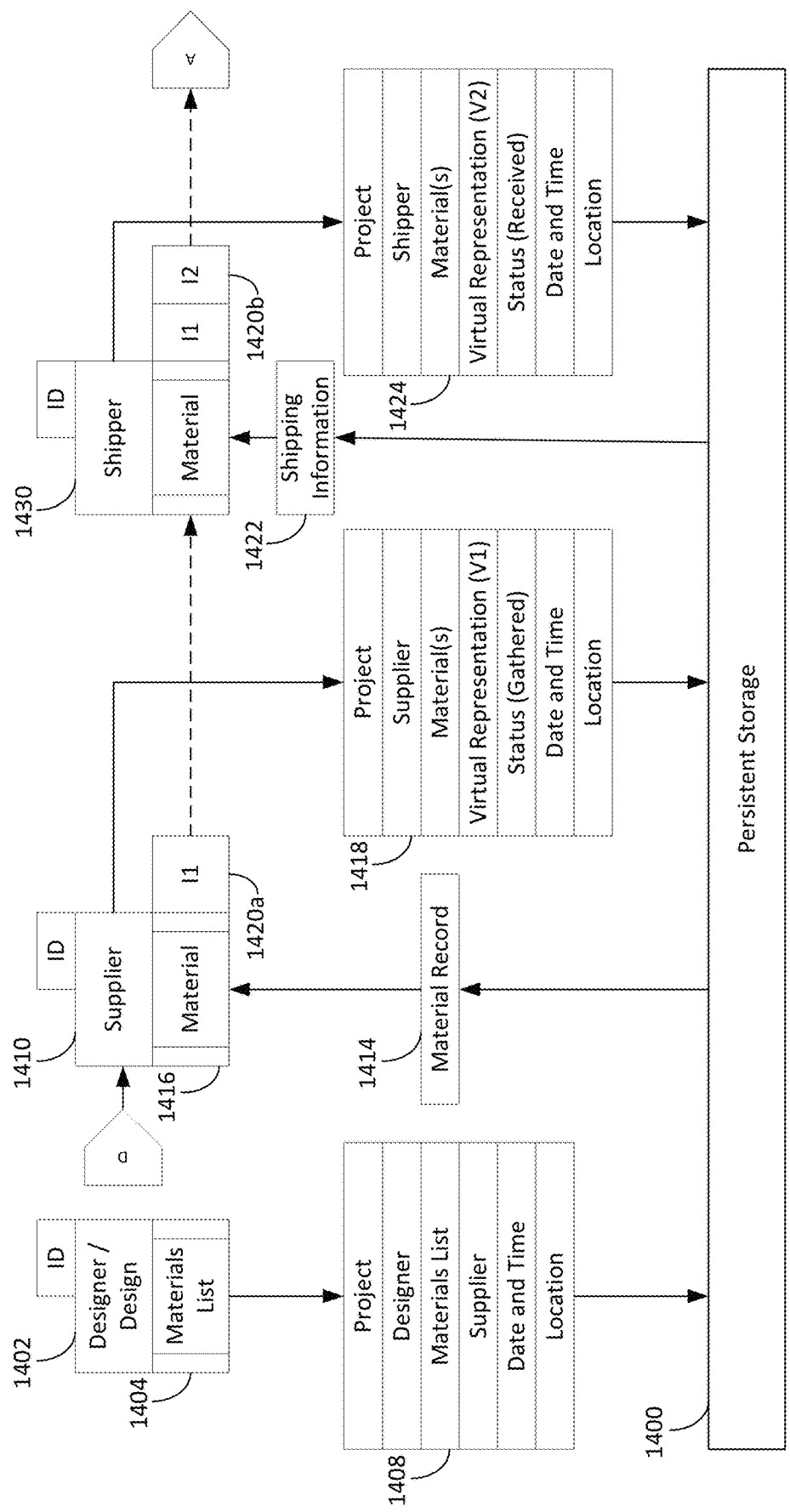
FIG. 14A is a flowchart of aspects of the invention.
Figure 14B:
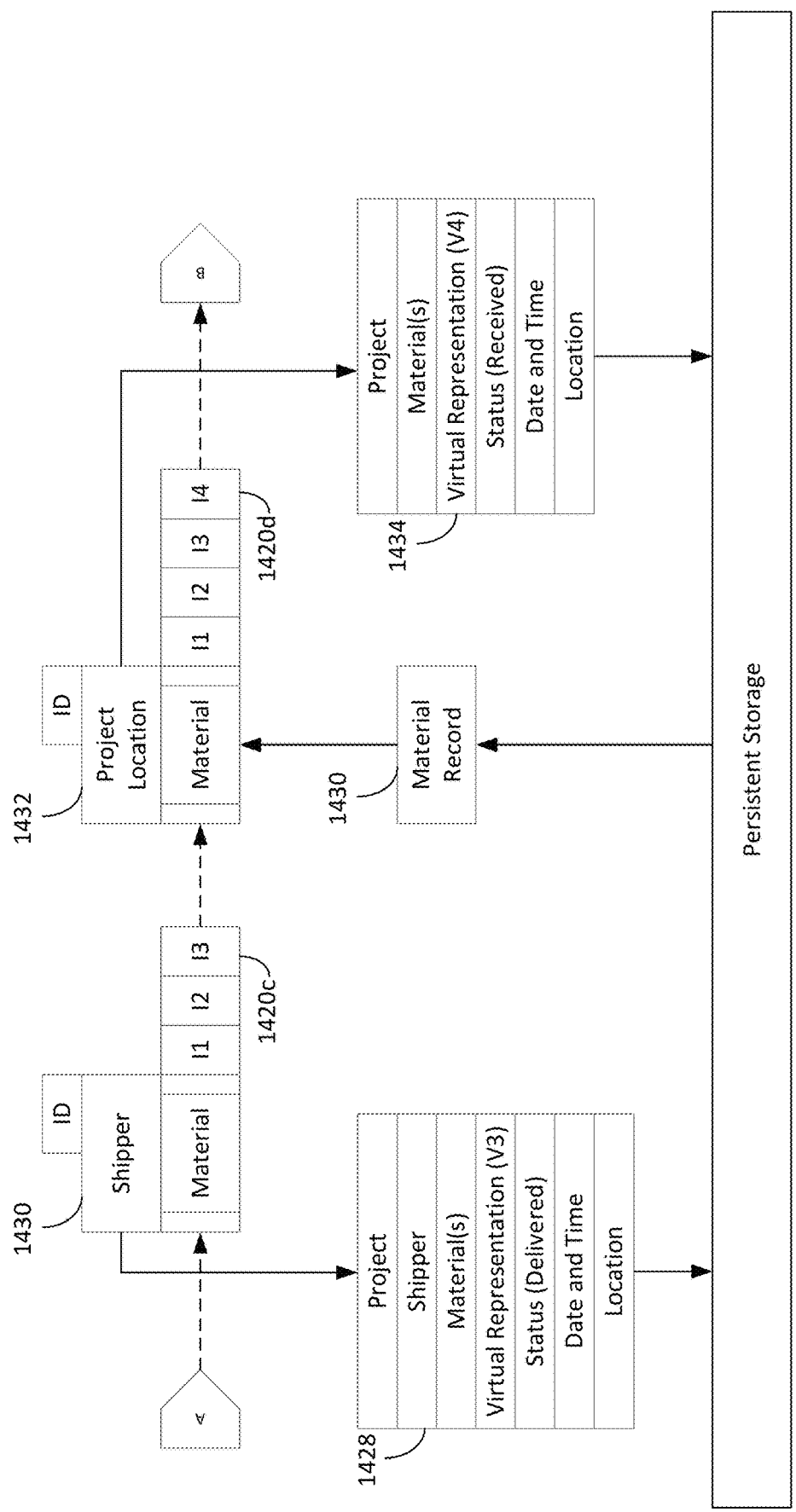
FIG. 14B is a flowchart of aspects of the invention.
Figure 14C:
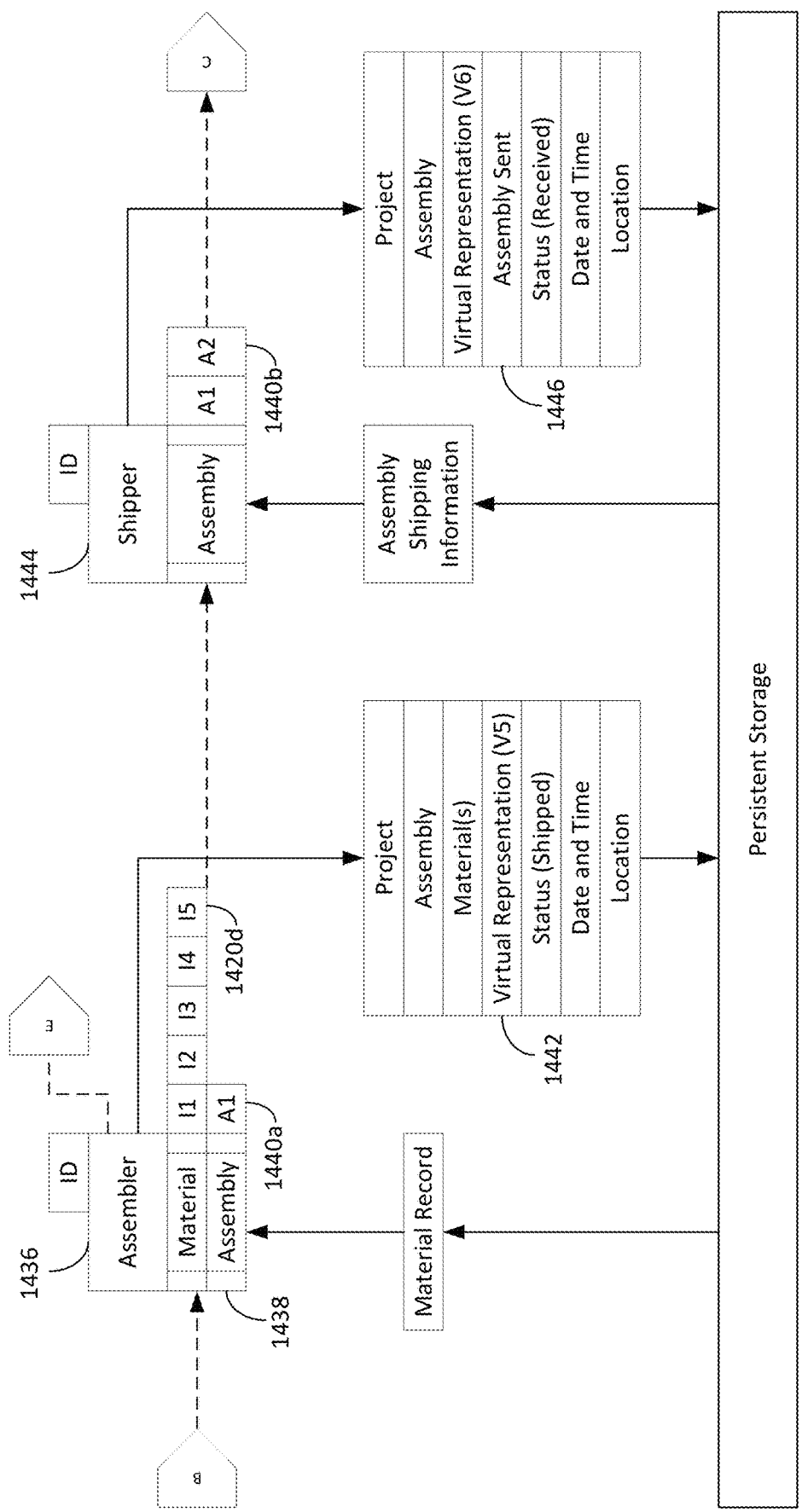
FIG. 14C is a flowchart of aspects of the invention.

Referring to FIG. 14C, the project location can be an assembler, or the assembler can be at a separate location from the project. For example, in the manufacturing of a vehicle, the project location can be the assembly line for the vehicle and multiple assembly locations can be involved. The main assembly line can be the project location and the assembler can be a component or sub-component of the manufacturing process. This system can be used for the project, or sub-project that are included in the overall project. Further a sub-project can be treated as a project as discussed herein.

An assembler computer system 1436 can be used to retrieve the material record from the immutable storage. The material record can be used to match the materials delivered to the assembler to verify that the proper materials were received by the assembler. The assembler can add indicia 1420d ($I_5$) to the material, or use other verification methods described herein, to capture the event. The assembler can also capture the material used and the assembly 1438 by adding a indicia 1440a ($A_1$) to the assembly. An assembler record 1442 can be created and stored on the immutable storage. The assembler record can include the project, assembly description and other information, assembler, material(s) used, virtual representation, shipping information date, time, location of the assembly, other metadata, and any combination.

One verification can be the comparison of an image of the physical object taken at the first event and the image of the physical object taken at the second event. In one embodiment, the determination if the two images represent the same physical object can be made by comparison the distance between the images. The distance between the images of the two object captures do not have to be identical but can be defined by the "closeness" between the images. In one embodiment, the distance can use the Euclidean distance between the $l^{th}$ and $j^{th}$ physical object. Distance between the p-dimensional vectors can be represented as:

$$d_E(i,j) = \sqrt{(\Sigma_{k=1}^{P}(x_{ik}-x_{jk})^2)} \quad (1)$$

or by using the weighted Euclidean distance that can be represented as:

$$d_E(i,j) = \sqrt{(\Sigma_{k=1}^{P}w_k(x_{ik}-x_{jk})^2)} \quad (2)$$

Where $d_E$=distance, i=first image, j=second image, and w=weight between kth measure which can be subject to the following $$0 < w_i < 1 \text{ and } \Sigma_{i=1}^{n} 1 \quad (3)$$

In one embodiment, the verification process can include an individual retrieving the first image of the physical object and comparing the first image with the physical object in proximity of the individual. The individual can review the first event record and the second event record to also make a determination of the physical object has remained the same from the first event to the second event. Information. In one embodiment, multiple individual and computer system can make the comparison. The comparison can also be crowd sourced so that multiple verifications are made from an individual computer system and any combination.

Once completed, the assembly may need to be delivered to another location. The assembler record can include shipping information, or an assembly shipping record can be created and stored on the persistent record. If the assembly needs to be delivered, a second shipper can use a second shipper computer system 1444 to retrieve the shipping record, assembler record or other shipping information that is used to identify the origin, locations, assembly, pick up time, delivery time and other information associated with the transportation of the assembly from one location to another. The assembly can be received by the second shipper and the second shipper can capture the event such as with a indicia 1440*b* ($A_2$) to the assembly representing that the assembly has been verified by the second shipper as properly provided and received by the shipper. A second shipper pick up record 1446 can be created and stored on the immutable storage.

Figure 14D:
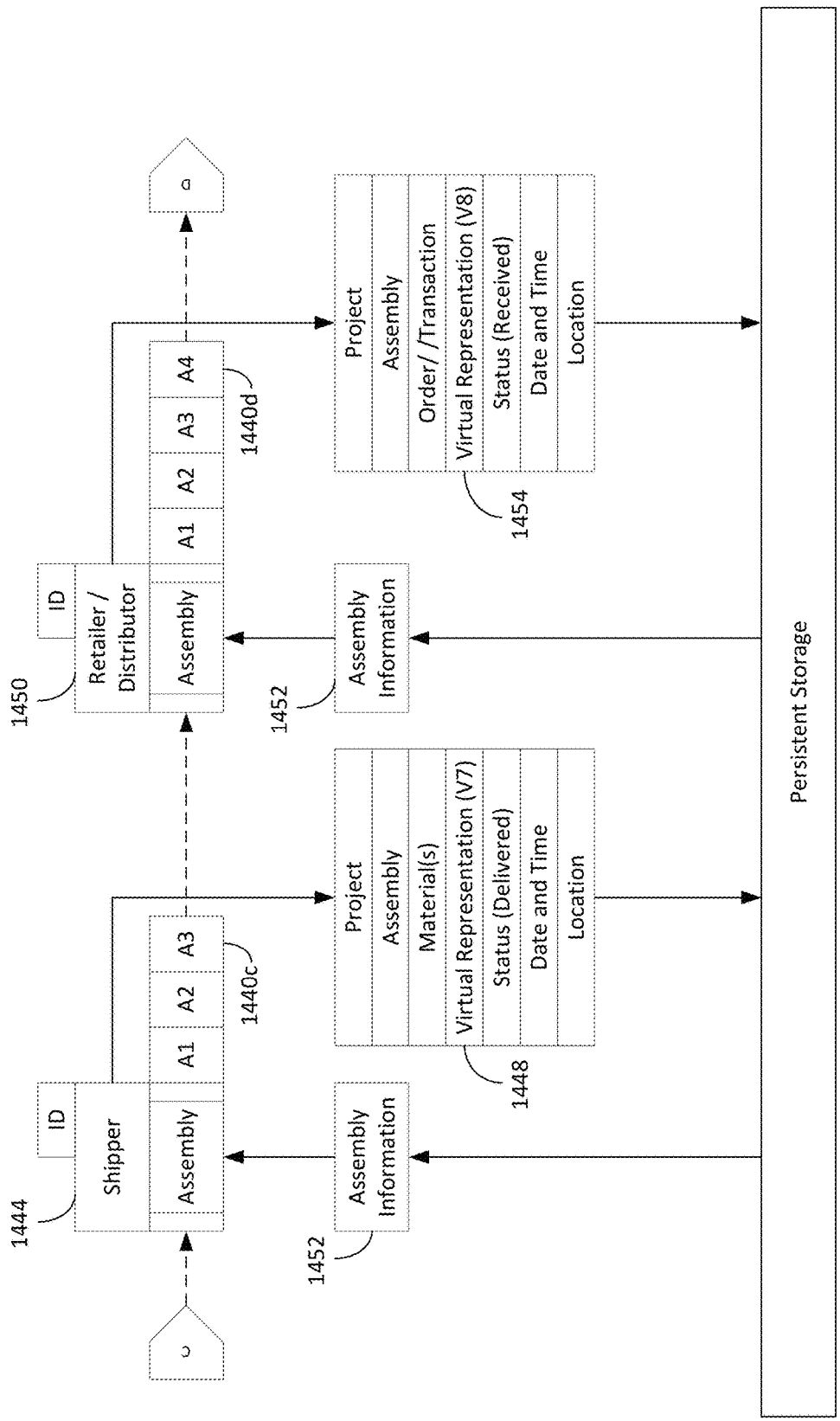
FIG. 14D is a flowchart of aspects of the invention; and,
FIG. 14E is a flowchart of aspects of the invention.

Referring to FIG. 14D, the second shipper can deliver the assembly to a retailer, distributor, or customer. The assembly can be a component to be further used or a final product. When the second shipper delivers the assembly to a retailer or distributor, the second shipper can create a second shipper delivery record 1448 using a second shipper computer system 1444. The second shipper can capture the event such as using a indicia 1440*c* ($A_3$) representing that the proper assembly was delivered to the proper location. The second shipper can use the verifications that are part of the virtual representation to match $A_3$ with the material and the information stored on the immutable storage.

The retailer or distributor computer system 1450 can be used to verify that the materials were properly delivered by retrieving the assembly record 1452 or second shipper record 1448 from the immutable storage and using the record to match the physical assembly delivered. The retailer or distributor can capture the event and can add a indicia 1440*d* ($A_4$) representing that the proper assembly was received at the proper location. A retailer distributor record 1454 can be created and stored on the immutable storage.

Figure 14E:
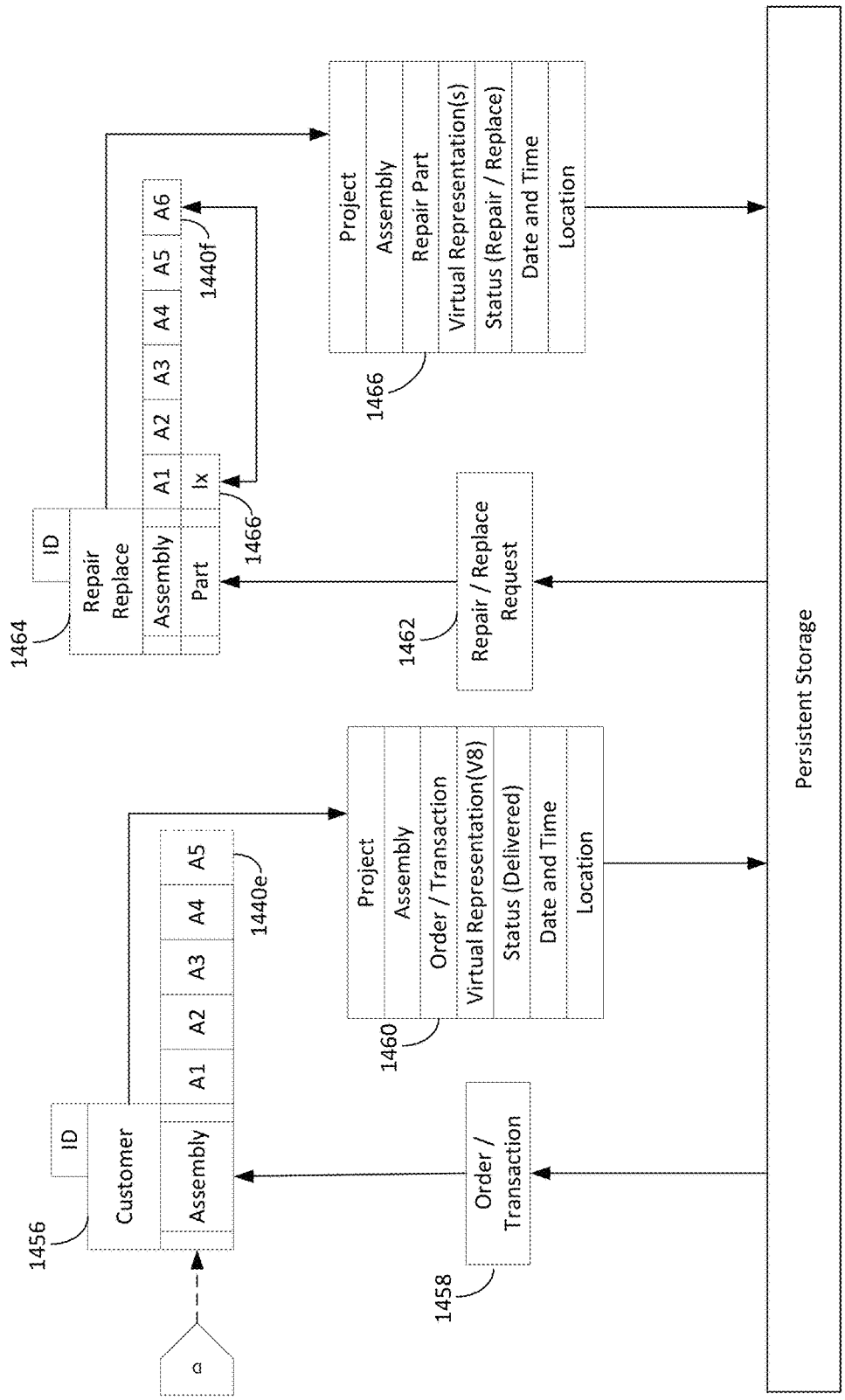

Referring to FIG. 14E, a customer can receive the assembly as using a customer computer system 1456 to retrieve or otherwise receive an order record 1458 from the immutable storage or other system requesting that a customer receive the assembly. The customer can be shipped the assembly using the system as described herein with a shipper performing the steps and the system performing the steps associated with the shipper and second shipper above. A third shipper can create a third shipper pickup and delivery record that can be stored on the immutable storage verifying that the assembly was properly provided from the realtor or distributer to the customer. The customer may capture the event and can add a indicia 1440*e* ($A_5$) to the assembly that can be associated with the virtual representation ($V_8$). A customer record 1460 can be stored on the immutable storage.

Using this system, the customer can be assured that the assembly was independently verified and authenticated from the design to the delivery to the customer and that the virtual representation of the assembly and its components (e.g., materials) are paired.

In one embodiment, a repair request 1462 can be created and stored on the persistent server. The repair request can be associated with the assembly and retrieved by a repair computer system 1464. The repair company can receive a part using the system described herein, perform a repair or replacement action, and capture the event such as by using a indicia 1440*f* ($A_6$) to the assembly indicating that the assembly has had a part repaired or replaced. The repair part can also have a preexisting indicium from the use of the system herein and the repair company can capture the event such as by using a indicia ($I_x$). A repair record 1466 can be created and stored on the immutable storage.

The system described herein can pair the physical material and/or assembly with a virtual representation. Failure to pair the physical material or assembly with the virtual representation can negatively impact areas such as regulatory requirements. Regulatory requirements are a set of rules that can specify the standards for a project. Regulatory requirements impact designs, materials, worker's license and experience the project and process. For example, a building code may require that construction materials be installed in accordance with manufacturer's specifications and warranty regulations. Failure to follow the building codes can result in the project not being approved, errors, lack of customer satisfaction, insurance claims, injury, litigation, and other negative ramifications. Tracking, management, and verification of materials to ensure compliance with regulatory requirements and proper installation according to applicable specifications is an important aspect to many projects and processes. Tracking and record keeping during the project or process can be beneficial, as it can be difficult to perform these tasks after project or process completion because the materials can be hidden from view or otherwise inaccessible. For example, electrical wiring in a project or process can be hidden behind walls and ceilings once the project is complete.

Systems at multiple locations may be interconnected using image capture devices, RFID, QR codes, barcodes, biometric scanners, still cameras, video cameras, and the like to identify individuals or machines that are performing verifications during the process. Further, multiple individuals or machines are performing verifications so that there is not a reliance upon any one entity for verifications. The processing of capturing data, including images, from the multiple systems at multiple locations can be used to improve the verification of proper materials and assemblies as well as to pair the physical items with the virtual representation.

Verification of processes, inspections, completions and deliveries with adjustments and notifications (manual and automated) with confirmation would ensure increased productivity, especially if accessible in real time at the location. Real time processes and procedures planned with corresponding training and manuals would improve quality control and efficiency. This has been a long felt need in the prior art that has not been satisfied with a controller that is uniquely associated with an asset location.

Automated verification of quantities, quality, and correct product deliveries along with after delivery tracking of materials with accountability is seldom used. Designated delivery areas with geofenced control and tracking of materials once delivered would help prevent loss. Confirmation of products integrated at the asset location provides transparency regarding sourcing, warranties, as well as future reference during the structure and individual product's life of use.

By using the various tags and virtual representations, each entity in the process can verify that the physical materials match any record the precedes that entity.

This process can include internal and external individuals and machines for performing inspections (e.g., verifications). For example, the system can receive a set of internal inspection information entered into the system from an internal inspector representing an internal physical inspection of the project, material or assembly. As the items travel, an internal inspector can provide inspection information representing the stages of the project. The system can also receive a set of external inspection information from an external inspector and an external inspection computer device representing a third-party physical inspection of the project at predetermined stages of the project. Based upon the internal inspection, external inspection or both, an inspection record can be created and stored on the immutable storage.

The verified pairing described herein can also be used to verifiable pair physical assets with installation instructions, storage instructions, warranties, ownership, service, maintenance, and any combination thereof.

The system can also facilitate the use of digital wallets. The information that is contained on the digital wallet can be paired with a physical object so that transactions associated with the physical object can be conducted with verification that the digital representation in the digital wallet represents the physical object, whether the physical object is fungible or unique.

The invention claimed is:

1. A computerized system for auditing an immutable ledger comprising:
   a computer system in communication with a database and an immutable storage;
   an event record having event data captured from a data capture device wherein the event data includes a location, a time, an event information, and a set of metadata wherein the set of metadata includes a digital representation captured by the data capture device of a physical object wherein the event record is stored on the database;
   a first verification code included in the event record digitally representing the event record stored on the immutable ledger;
   a set of computer readable instructions in communications with the computer system configured for:
   retrieving the event record from the database,
   retrieving the first verification code from the immutable ledger;
   creating a second verification code representing the event record;
   comparing the first verification code to the second verification code;
   creating a matching record in response to the first verification code matching the second verification code; and,
   storing the second verification code on the immutable storage.

2. The computerized system of claim 1 wherein the database is a centralized database.

3. The computerized system of claim 1 wherein the immutable storage is a distributed ledger.

4. The computerized system of claim 1 wherein the first verification code is created from a secure hash algorithm.

5. The computerized system of claim 1 wherein the first verification code is created from a set of proof-of-work computer readable instructions.

6. The computerized system of claim 1 wherein the first verification code is created from a set of proof-of-stake computer readable instructions.

7. The computerized system of claim 1 wherein the data capture device is included in a geolocated computer device.

8. The computerized system of claim 1 wherein the data capture device is in communication with the computer system.

9. The computerized system of claim 1 included a computer device in communication with the computer system and the set of computer readable instructions are configured for transmitted a verified message to the computer device when the first verification code matches the second verification code.

10. The computerized system of claim 9 wherein the computer device is a regulatory computer device.

11. The computerized system of claim 9 wherein the set of computer readable instructions are configured for transmitting an unverified message to the computer device when the first verification code does not match the second verification code.

12. The computerized system of claim 1 included a computer device in communication with the computer system and the set of computer readable instructions are configured for extracting the location from the event record and transmitting the location to the computer device.

13. The computerized system of claim 1 wherein the event record includes a physical verification data representing a verification that the digital representation was created of the physical object at the location.

14. The computerized system of claim 13 wherein the physical verification data includes metadata representing that an individual compared the digital representation with the physical object.

15. The computerized system of claim 13 wherein the physical verification data includes metadata representing an automated comparison of the digital representation with the physical object.

16. The computerized system of claim 1 wherein the digital representation includes a digital indicium data associated with a physical indicium associated with the physical object.

17. The computerized system of claim 16 wherein the physical indicium is taken from the group consisting of an image of the physical object, a label affixed to the physical object, a radio frequency identification tag, an ultra-high frequency tag, a bar code, a QR code, a Bluetooth beacons, alpha-numeric characters, and any combination thereof.

18. The computerized system of claim 1 wherein the first verification code is an encrypted record having a predetermined length.

19. The computerized system of claim 18 wherein the first verification code has a first length, and the second verification code has a second length and the first length, and the second length are equivalent.

20. A computerized system for auditing an immutable ledger comprising:
   a computer system in communication with a database and an immutable storage;
   an event record having event data captured from a data capture device wherein the event data includes a location, a time, an event information, and a set of metadata wherein the set of metadata includes a digital representation captured by the data capture device of a physical object wherein the event record is stored on the database;
   a first hash of the event record digitally representing the event record stored on the immutable ledger;
   a set of computer readable instructions in communications with the computer system configured for:
   retrieving the first hash from the immutable ledger,
   creating a second hash in response to the event record;
   comparing the first hash with the second hash;
   creating a matching record in response to the first hash matching the second hash.

21. A computerized system for auditing an immutable ledger comprising:
- a computer system in communication with a database and an immutable storage;
- a set of computer readable instructions in communications with the computer system configured for:
  - creating an event record having event data captured from a data capture device wherein the event data includes a location, a time, an event information, and a set of metadata wherein the set of metadata includes a digital representation captured by the data capture device of a physical object wherein the event record is stored on the database;
  - creating a first hash of the event record digitally representing the event record stored on the immutable ledger;
  - creating a second hash in response to the event record;
  - comparing the first hash with the second hash;
  - creating a matching record in response to the first hash matching the second hash.

* * * * *

UNITED STATES PATENT AND TRADEMARK OFFICE
CERTIFICATE OF CORRECTION

PATENT NO. : 11,610,202 B2
APPLICATION NO. : 17/686502
DATED : March 21, 2023
INVENTOR(S) : Jeremy Blackburn et al.

It is certified that error appears in the above-identified patent and that said Letters Patent is hereby corrected as shown below:

On the Title Page

Item (63) should read:
(63) This application is a continuation in part of application No. 17/566,957, filed on 12/31/2021 which is a continuation in part of Application No. 17/561,827, filed 12/24/2021, now Pat. No. 11,574,319, which is a continuation in part of application No. 17/531,746 filed 11/20/2021, Pat. No. 11,482,325 which is a continuation in part of application No. 17/531,598 filed 11/19/2021 which is a continuation in part of application No. 17/344,043 filed 06/10/2021 which is a continuation in part of application No. 17/230,911 filed 04/14/2021, now Pat. No. 11,288,761 which is a continuation in part of application No. 17/176,056 filed 02/15/2021, now Pat. No. 11,288,308 which is a continuation in part of application No. 17/128,084 filed 12/19/2020, now Pat. No. 11,521,157 which is a continuation in part of application No. 16/997,840 filed August 19, 2020, now Pat. No. 11,449,949 which is a continuation in part of application No. 16/994,585 filed August 15, 2020, now Pat. No. 11,232,562 which is a continuation in part of application No. 16/991,916 filed on August 12, 2020, now Pat. No. 11,216,823, which is a continuation in part of application No. 16/876,080, filed May 17, 2020, now Pat. No. 11,423,360 which is a continuation in part of application No. 16/810,782 filed on March 5, 2020, now Pat. No. 11,216,781 which is a continuation in part of application No. 16/510,634 filed on July 12, 2019, now Pat. No. 10,713,737 and application No. 16/510,642 filed on July 12, 2019, now Pat. No. 11,216,772. Application Nos. 16/510,642 and 16/510,634 are both continuations of application No. 16/452,076 filed June 25, 2019.

Signed and Sealed this
Sixteenth Day of July, 2024

Katherine Kelly Vidal
*Director of the United States Patent and Trademark Office*